US012591145B2

(12) United States Patent
Shi et al.

(10) Patent No.: US 12,591,145 B2
(45) Date of Patent: Mar. 31, 2026

(54) ACHROMATIC BEAM DEFLECTOR FOR LIGHT-EFFICIENT DISPLAY PANEL

(71) Applicant: Meta Platforms Technologies, LLC, Menlo Park, CA (US)

(72) Inventors: Zhimin Shi, Bellevue, WA (US); Fenglin Peng, Redmond, WA (US); Zhaocheng Liu, Redmond, WA (US); Zhujun Shi, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 628 days.

(21) Appl. No.: 17/948,887

(22) Filed: Sep. 20, 2022

(65) Prior Publication Data

US 2023/0101633 A1 Mar. 30, 2023

Related U.S. Application Data

(60) Provisional application No. 63/249,790, filed on Sep. 29, 2021.

(51) Int. Cl.
*G02B 27/42* (2006.01)
*G02B 5/18* (2006.01)
*G02B 27/01* (2006.01)

(52) U.S. Cl.
CPC ....... *G02B 27/4227* (2013.01); *G02B 5/1828* (2013.01); *G02B 5/1866* (2013.01); *G02B 27/0172* (2013.01); *G02B 2207/101* (2013.01)

(58) Field of Classification Search
CPC .......................... G02B 27/4227; G02B 5/1828; G02B 5/1866; G02B 27/0172; G02B 2207/101;

(Continued)

(56) References Cited

U.S. PATENT DOCUMENTS 10,378,887 B2 * 8/2019 Na ..................... G01B 11/2545
10,896,994 B1 * 1/2021 Shipton ............... H10H 20/812
(Continued)

FOREIGN PATENT DOCUMENTS

WO WO-2018222688 A1 12/2018
WO WO-2020065380 A1 4/2020
WO WO-2023055894 A1 4/2023

OTHER PUBLICATIONS

International Preliminary Report on Patentability for International Application No. PCT/US2022/045176, mailed Apr. 11, 2024, 7 pages.

(Continued)

*Primary Examiner* — Collin X Beatty
(74) *Attorney, Agent, or Firm* — Greenberg Traurig, LLP

(57) ABSTRACT

A device includes an array of light sources configured to emit light beams, and a metasurface including a plurality of nanostructures and configured to receive and deflect the light beams emitted by the array of light sources. The metasurface includes a plurality of regions. Nanostructures in different regions of the plurality of regions are configured to deflect center light rays (with peak intensity) of the light beams into different directions towards a target, such as display optics of a near-eye display. In some embodiments, nanostructures in each region of the plurality of regions are configured to deflect center light rays of light beams of two or more different colors into a same direction or similar directions towards the target.

20 Claims, 25 Drawing Sheets

(58) Field of Classification Search

CPC .............. G02B 5/1809; G02B 27/0081; G02B 2027/0116; G02B 2027/0174; G02B 1/002

See application file for complete search history.

(56) References Cited

U.S. PATENT DOCUMENTS

| | | | | |
|---|---|---|---|---|
| 11,029,529 | B2 * | 6/2021 | Chou | G02B 27/60 |
| 11,579,456 | B2 * | 2/2023 | Riley, Jr. | H01S 5/423 |
| 11,874,476 | B1 * | 1/2024 | Kress | G02B 27/30 |
| 12,153,233 | B1 * | 11/2024 | Xin | H10F 77/40 |
| 12,416,830 | B2 * | 9/2025 | Lim | G02F 1/133606 |
| 2015/0219806 | A1 | 8/2015 | Arbabi et al. | |
| 2017/0212285 | A1 * | 7/2017 | Arbabi | G02B 1/002 |
| 2017/0219739 | A1 * | 8/2017 | Lin | G02B 5/008 |
| 2017/0310907 | A1 * | 10/2017 | Wang | G02B 19/009 |
| 2018/0052501 | A1 | 2/2018 | Jones, Jr. et al. | |
| 2018/0164472 | A1 * | 6/2018 | Gao | G09F 9/30 |
| 2018/0252857 | A1 | 9/2018 | Glik et al. | |
| 2018/0348548 | A1 * | 12/2018 | Visser | G02B 1/002 |
| 2019/0196068 | A1 * | 6/2019 | Tsai | G02B 1/002 |
| 2020/0174163 | A1 | 6/2020 | Han et al. | |
| 2021/0088694 | A1 | 3/2021 | Lee et al. | |
| 2021/0132255 | A1 | 5/2021 | Barton, III et al. | |
| 2021/0159373 | A1 | 5/2021 | Grundmann | |
| 2021/0296539 | A1 * | 9/2021 | Tamma | H10H 20/814 |
| 2022/0137258 | A1 * | 5/2022 | Bartlett | G09G 3/003 345/694 |
| 2023/0170446 | A1 | 6/2023 | Mezouari et al. | |
| 2023/0273434 | A1 | 8/2023 | Vinish | |

OTHER PUBLICATIONS

International Search Report and Written Opinion for International Application No. PCT/US2023/013433, mailed Jun. 13, 2023, 12 pages.

Non-Final Office Action mailed Aug. 20, 2024 for U.S. Appl. No. 17/681,228, filed Feb. 25, 2022, 15 pages.

Dou K., et al., "Off-Axis Multi-Wavelength Dispersion Controlling Metalens for Multi-Color Imaging," Opto-Electronic Advances, Apr. 20, 2020, vol. 03, No. 04, 7 pages.

International Search Report and Written Opinion for International Application No. PCT/US2022/045176, mailed Feb. 10, 2023, 8 pages.

Khorasaninejad M., et al., "Achromatic Metalens over 60 nm Bandwidth in the Visible and Metalens with Reverse Chromatic Dispersion," Nano Letters, Jan. 26, 2017, vol. 17, No. 03, pp. 1819-1824.

Khorasaninejad M., et al., "Supporting Information: Achromatic Metalens over 60 nm Bandwidth in the Visible and Metalens with Reverse Chromatic Dispersion," Nano Letters, 2017, 7 pages.

Liu Z., et al., "Generative Model for the Inverse Design of Metasurfaces," Nano Letters, Sep. 12, 2018, vol. 18, No. 10, pp. 6570-6576.

Liu Z., et al., "Tackling Photonic Inverse Design with Machine Learning," Advanced Science, Jan. 7, 2021, vol. 08, No. 05, 15 pages.

Shi Z., et al., "Single-Layer Metasurface with Controllable Multiwavelength Functions," Nano Letters, Feb. 20, 2018, vol. 18, No. 04, pp. 2420-2427.

Zhang Y., et al., "Multi-round Surrogate-based Optimization for Benchmark Aerodynamic Design Problems," 54th AIAA Aerospace Sciences Meeting, Jan. 4, 2016, 17 pages.

Final Office Action mailed Feb. 18, 2025 for U.S. Appl. No. 17/681,228, filed Feb. 25, 2022, 17 pages.

* cited by examiner

ACHROMATIC BEAM DEFLECTOR FOR LIGHT-EFFICIENT DISPLAY PANEL

CROSS-REFERENCE TO RELATED APPLICATIONS

This application claims the benefit of and priority to U.S. Provisional Application No. 63/249,790, filed Sep. 29, 2021, entitled "ACHROMATIC BEAM DEFLECTOR FOR LIGHT-EFFICIENT DISPLAY PANEL," which is herein incorporated by reference in its entirety for all purposes.

BACKGROUND

An artificial reality system, such as a head-mounted display (HMD) or heads-up display (HUD) system, generally includes a near-eye display system in the form of a headset or a pair of glasses and is configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through). The display system generally includes one or more light sources that are driven to output light at various luminance levels.

SUMMARY

This disclosure relates generally to near-eye display systems. More specifically, and without limitation, techniques disclosed herein relate to meta-structures for more efficiently and achromatically coupling light from an array of light sources in a near-eye display system to user's eyes. Various inventive embodiments are described herein, including devices, systems, methods, processes, materials, and the like.

According to certain embodiments, a device may include an array of light sources configured to emit light beams, and a metasurface including a plurality of nanostructures and configured to receive and deflect the light beams emitted by the array of light sources. The metasurface may include a plurality of regions. Nanostructures in different regions of the plurality of regions may be configured to deflect center light rays (e.g., having peak intensity) of the light beams into different directions towards a target. In some embodiments, the array of light sources may be configured to emit light beams of two or more colors, and nanostructures in each region of the plurality of regions may be configured to deflect center light rays of the light beams of two or more different colors into a same direction or similar directions (e.g., with differences less than about 5%, 2%, or 1%) towards the target.

In some embodiments, the metasurface may include one or more layers. Each layer of the one or more layers may include a set of nanostructures of the plurality of nanostructures. In some embodiments, the set of nanostructures in each layer may be characterized by a same height and different cross-sectional areas. In some embodiments, the set of nanostructures in each layer may have different heights.

In some embodiments, the metasurface may further be configured to collimate, focus, or diverge the light beams emitted by the array of light sources. The plurality of nanostructures may include a semiconductor material, a dielectric material, an organic material, or a combination thereof, and the metasurface may also include a low-refractive index material characterized by a refractive index lower than a refractive index of the plurality of nanostructures.

The plurality of nanostructures may be characterized by a uniform height or different heights. Each nanostructure of the plurality of nanostructures may be characterized by a cross-sectional shape of a polygon, a circle, an oval, a ring, a polygon with an aperture, or an irregular shape. Each nanostructure of the plurality of nanostructures may be characterized by a cross-sectional dimension comparable to or less than a wavelength of the light beams emitted by the array of light sources. Nanostructures in different regions of the plurality of regions may have different cross-sectional shapes, different sizes, different pitches, different orientations, or a combination thereof. In some embodiments, each region of the plurality of regions may have a phase profile of a lens, a lens array, an off-axis lens, a prism, a grating, a freeform optical component, or a combination thereof.

In some embodiments, nanostructures in each region of the plurality of regions may be configured to diffract incident light of different colors into different respective diffraction orders but at similar diffraction angles. In some embodiments, nanostructures in different regions of the plurality of regions may be characterized by different group delays. In some embodiments, the array of light sources may include light-emitting diodes (LEDs), micro-LEDs, organic LEDs (OLEDs), quantum dot LEDs (QDLEDs), quantum dot electro luminescent (QDEL) devices, Perovskite LEDs (PeLEDs), or a liquid crystal display panel including a plurality of color filters. In some embodiments, the array of light sources may be characterized by a minimum pitch less than about 100 μm, less than about 20 μm, less than about 10 μm, or less than about 5 μm. For example, in some embodiments, the array of light sources may have a variable pitch that may be small at the center of the array of light sources and may be larger at the peripherals of the array of light sources.

According to certain embodiments, a near-eye display may include an array of light sources configured to emit light beams, display optics configured to collect and project the light beams emitted by the array of light sources towards an eyebox of the near-eye display, and a metasurface between the array of light sources and the display optics. The metasurface may include a plurality of nanostructures and may be configured to receive and deflect the light beams emitted by the array of light sources towards the display optics. The metasurface may include a plurality of regions, and nanostructures in different regions of the plurality of regions may be configured to deflect center light rays of the light beams into different directions towards the display optics. The array of light sources may include, for example, LEDs, micro-LEDs, OLEDs, QDLEDs, QDEL devices, PeLEDs, or a liquid crystal display panel including a plurality of color filters.

In some embodiments of the near-eye display, the array of light sources may be configured to emit light beams of two or more colors, and nanostructures in each region of the plurality of regions may be configured to deflect center light rays of the light beams of two or more colors into approximately same directions (e.g., with differences less than about 5%, 2%, or 1%) towards the display optics. In some embodiments, the metasurface may include one or more layers.

Each layer of the one or more layers may include a set of nanostructures of the plurality of nanostructures. The set of nanostructures in each layer may be characterized by a same height and different cross-sectional areas, or may be characterized by different heights. In some embodiments, the metasurface may further be configured to collimate, focus, or diverge the light beams emitted by the array of light sources. In some embodiments, nanostructures in each region of the plurality of regions may be configured to diffract incident light of different colors into different respective diffraction orders but at approximately same diffraction angles (e.g., with differences less than about 10%, 5%, 2%, or 1%). In some embodiments, nanostructures in different regions of the plurality of regions may be characterized by different group delays.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
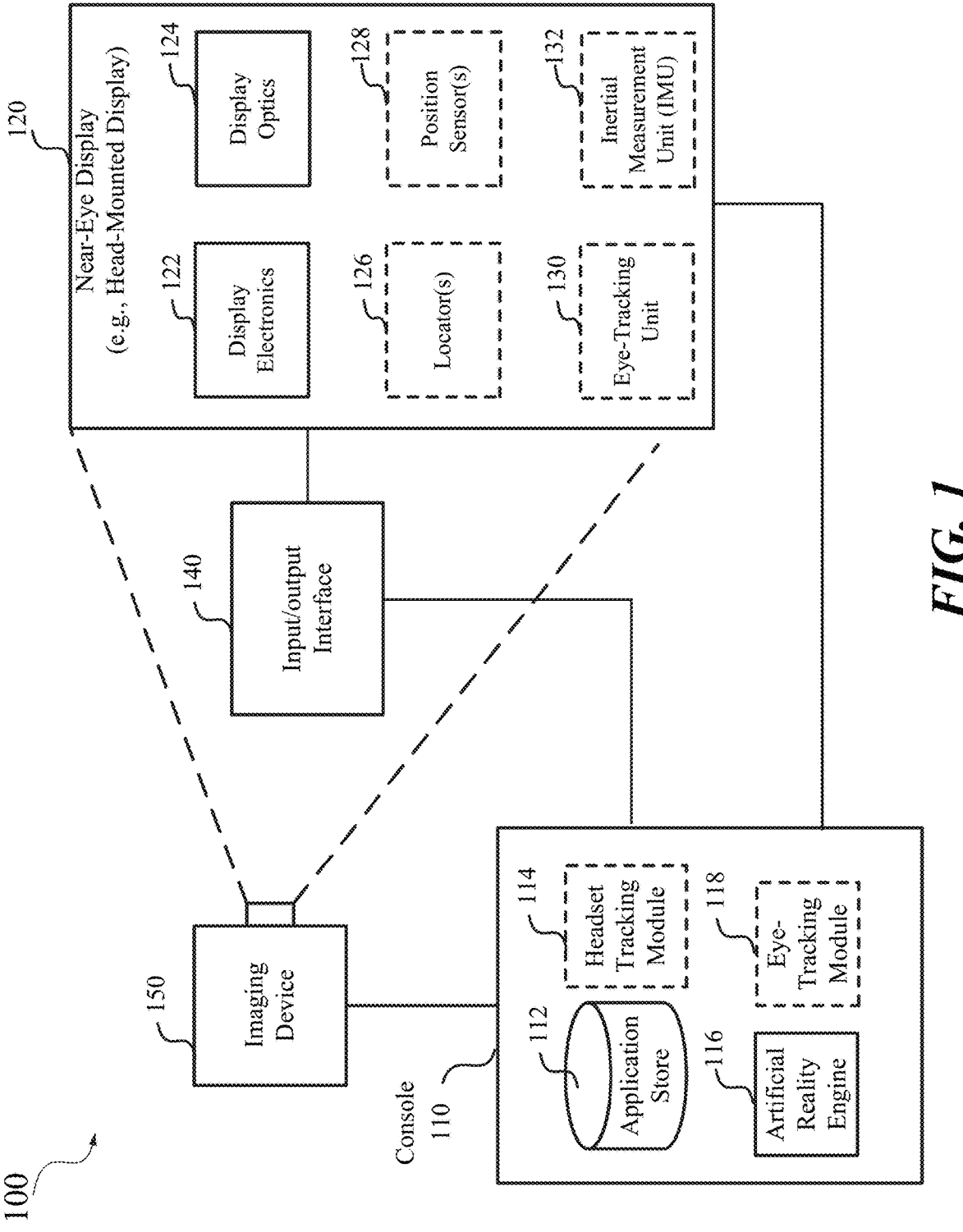
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to near-eye display systems. More specifically, and without limitation, techniques disclosed herein relate to meta-structures for more efficiently and achromatically coupling light from an array of light sources in a near-eye display system to user's eyes. Various inventive embodiments are described herein, including devices, systems, methods, processes, materials, and the like.

In some near-eye display systems, light emitted from an array of light sources, such as micro-light emitting diodes (micro-LEDs), organic LEDs (OLEDs), quantum dot LEDs (QDLEDs), quantum dot electro luminescent (QDEL) devices, and Perovskite LEDs (PeLEDs), may be coupled into a waveguide display or projected by display optics for delivering images to an eyebox. The overall efficiency $\eta_{tot}$ of a waveguide display system for artificial reality applications may be determined by $\eta_{tot}=\eta_{EQE}\times\eta_{in}\times\eta_{out}$, where $\eta_{EQE}$ is the external quantum efficiency (EQE) of each light source and may be proportional to the carrier (e.g., electron) injection efficiency, the internal quantum efficiency, and the light extraction efficiency (LEE), $\eta_{in}$ is the in-coupling efficiency of display light from the light sources into the waveguide, and $\eta_{out}$ is the out-coupling efficiency of the display light from the waveguide towards the user's eye. Only a fraction of the emitted light that is within a certain emission angle range may be coupled into the waveguide and eventually reach the user's eyes, due to the limited field of view of the display system. In some near-eye display systems, light from the light sources may be projected by display optics (e.g., a lens) to user's eyes, where the overall efficiency may be determined by the EQE of each light source and the efficiency of the display optics for collecting and directing the emitted light to the eyebox.

Many light emitting devices, such as micro-LEDs, OLEDs, QDLEDs, QDEL devices, and PeLEDs, may have Lambertian emission profiles. This may reduce the coupling efficiency from the light sources to the eyebox because some emitted light having large emission angles may not be collected and directed to the eyebox, and may become stray light that may reduce the quality of the displayed images. To improve the light efficiency of a display system, many display panels may be designed such that the emission angle of each light source is more directional.

However, when the emission angles of light sources in an array of light sources are uniformly controlled (e.g., collimated and propagating in about the same direction), light emitted by the light sources may not be uniformly collected and delivered to the eyebox of the display system. For example, light emitted by light sources near edges of the array of light sources may be collected and delivered to the eyebox of the display system at much lower efficiency than light emitted by light sources at the center of the array of light sources, due to the mismatch between the chief ray angles and the light emission directions of the light sources, which may cause non-uniform intensity or brightness variation in the displayed images. Therefore, light emitted from light sources at the edges of the array may need to be redirected (e.g., deflected) towards the display optics. Light emitted from the light sources can be redirected to desired directions using, for example, micro-lenses, wedges or prisms, gratings, or the like. For example, one technique to redirect the emitted light is using micro-lenses that are offset with respect to the light sources. This technique may need a precise pixel-level positioning and offset (and thus may be difficult to manufacture), and may have limited deflection angles or may cause crosstalk due to certain geometry limitations. In addition, the micro-lenses and micro-prisms may have chromatic aberrations that may reduce the image quality.

According to certain embodiments, achromatic beam deflectors that can achieve large deflection angles for a large range of incident angles may be used to redirect light emitted from light sources to user's eyes. The achromatic beam deflectors may include one or more layers of subwavelength structures (hereinafter "metasurfaces" or "meta-structures"). The achromatic beam deflector may achieve a spatially varying deflection angle over its area such that the light emitted from all or a majority of light source of a display panel can be redirected towards the eyebox. The achromatic beam deflectors can allow light in multiple color bands to be deflected by the same or similar angles. The achromatic beam deflectors can be either polarization independent or polarization selective depending on the light source property. Other functionalities can also be integrated into the metasurfaces through designs of individual meta-elements or the arrangement of different meta-elements. For example, the metasurface may be designed to both collimate (or focus) the emitted light (to modify the emission angle of each light source) and deflect the emitted light.

The metasurfaces may be manufactured using standard nanofabrication processes that are compatible with CMOS/NMOS/PMOS/TFT or other display-related fabrication processes. The metasurfaces can have sub-micron thicknesses and thus may allow for a large range of incidence angles (without any potential clipping or edge effect). The metasurfaces can be designed to have the same or very similar angular deflection (e.g., with differences less than about 5%, 2%, or 1%) for light in the red, green, and blue wavelength bands, and therefore may not need accurate alignment with the light emitting panel.

Techniques described herein may be used in conjunction with various technologies, such as an artificial reality system. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through). In some AR systems, the artificial images may be presented to users using LED-based display subsystem.

As used herein, the term "light emitting diode (LED)" refers to a light source that includes at least an n-type semiconductor layer, a p-type semiconductor layer, and a light emitting region (i.e., active region) between the n-type semiconductor layer and the p-type semiconductor layer. The light emitting region may include one or more semiconductor layers that form one or more heterostructures, such as quantum wells. In some embodiments, the light emitting region may include multiple semiconductor layers that form one or more multiple-quantum-wells (MQWs) each including multiple (e.g., about 2 to 6) quantum wells.

As used herein, the term "micro-LED" or "μLED" refers to an LED that has a chip where a linear dimension of the chip is less than about 200 μm, such as less than 100 μm, less than 50 μm, less than 20 μm, less than 10 μm, or smaller. For example, the linear dimension of a micro-LED may be as small as 6 μm, 5 μm, 4 μm, 2 μm, or smaller. Some micro-LEDs may have a linear dimension (e.g., length or diameter) comparable to the minority carrier diffusion length. However, the disclosure herein is not limited to micro-LEDs, and may also be applied to mini-LEDs and large LEDs.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light sources that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

Figure 2:
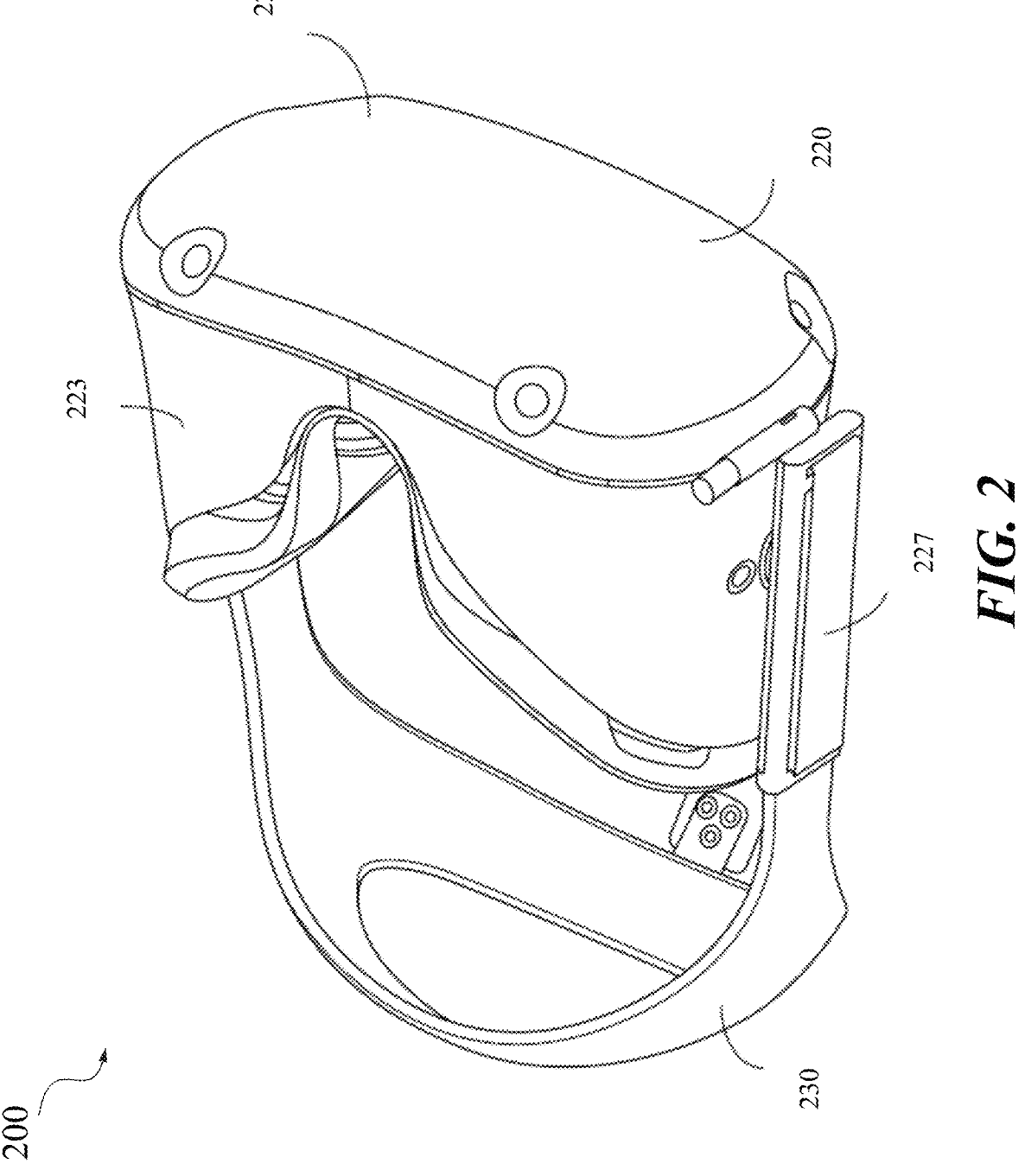
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMO-LED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
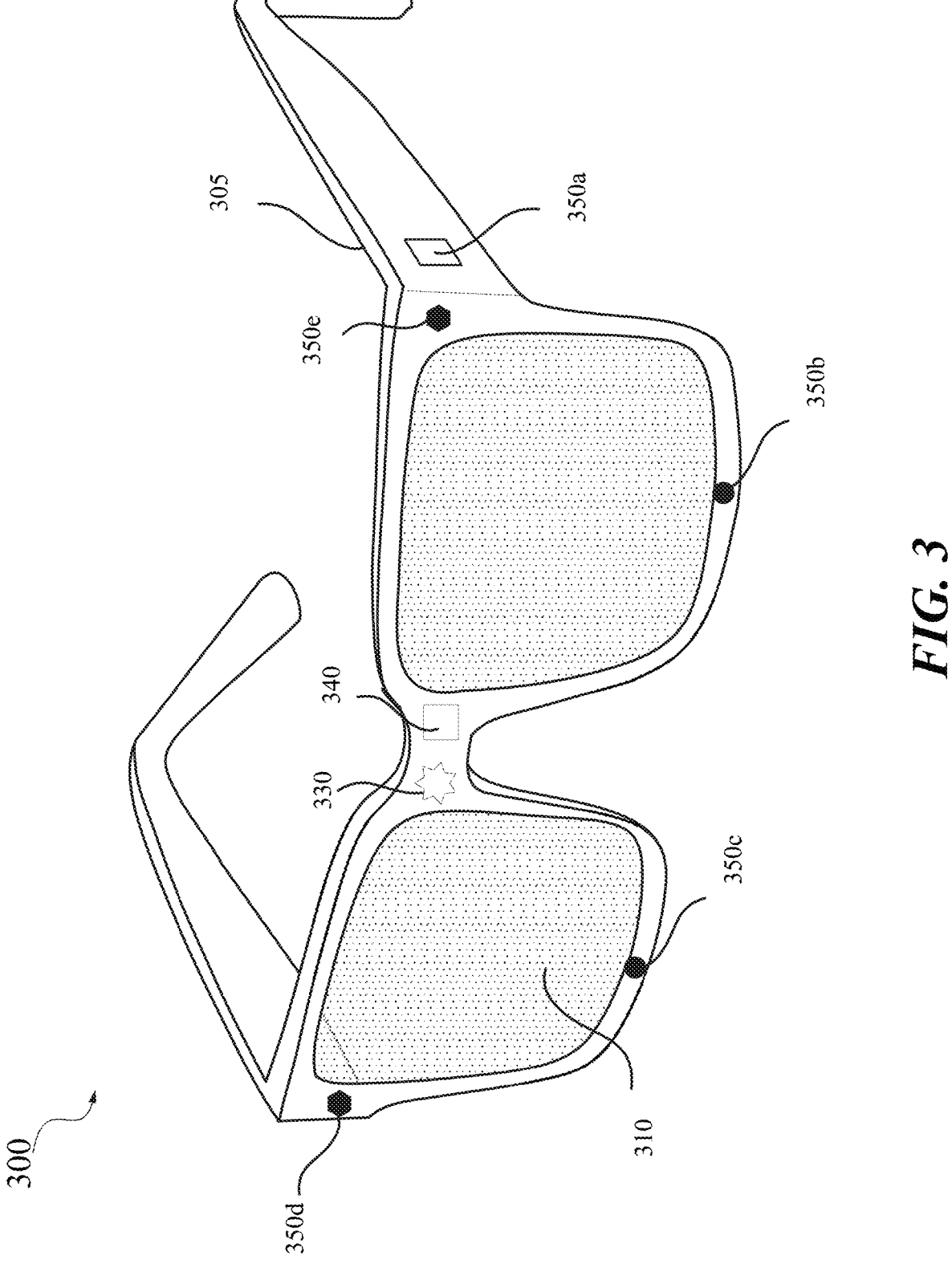
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
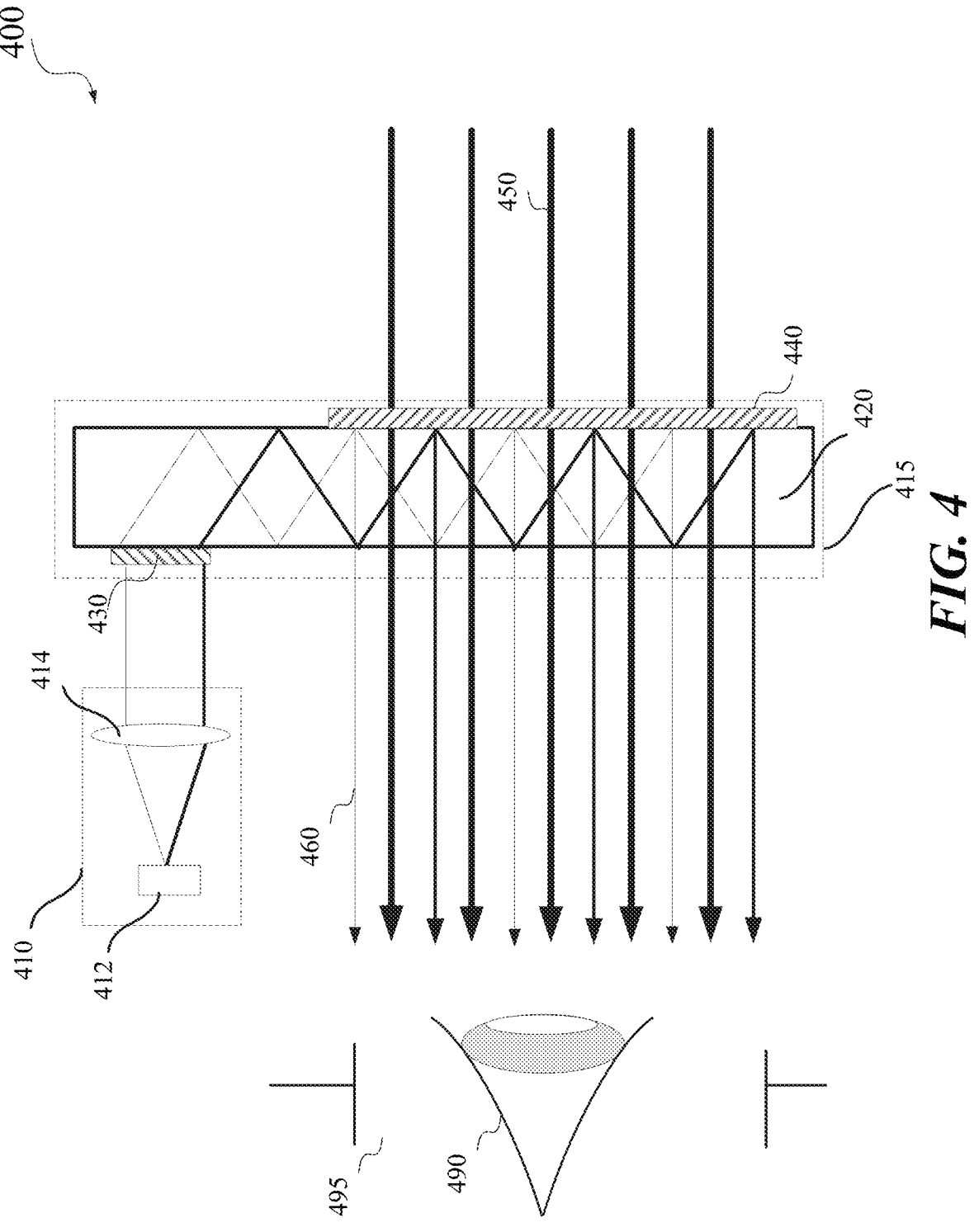
FIG. 4 illustrates an example of an optical see-through augmented reality system including a waveguide display according to certain embodiments.

FIG. 4 illustrates an example of an optical see-through augmented reality system 400 including a waveguide display according to certain embodiments. Augmented reality system 400 may include a projector 410 and a combiner 415. Projector 410 may include a light source or image source 412 and projector optics 414. In some embodiments, light source or image source 412 may include one or more micro-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above) each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440 each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements (DOEs), prisms, etc. For example, output couplers 440 may include reflective volume Bragg gratings or a transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and images of virtual objects projected by projector 410.

Figures 5A, 5B:
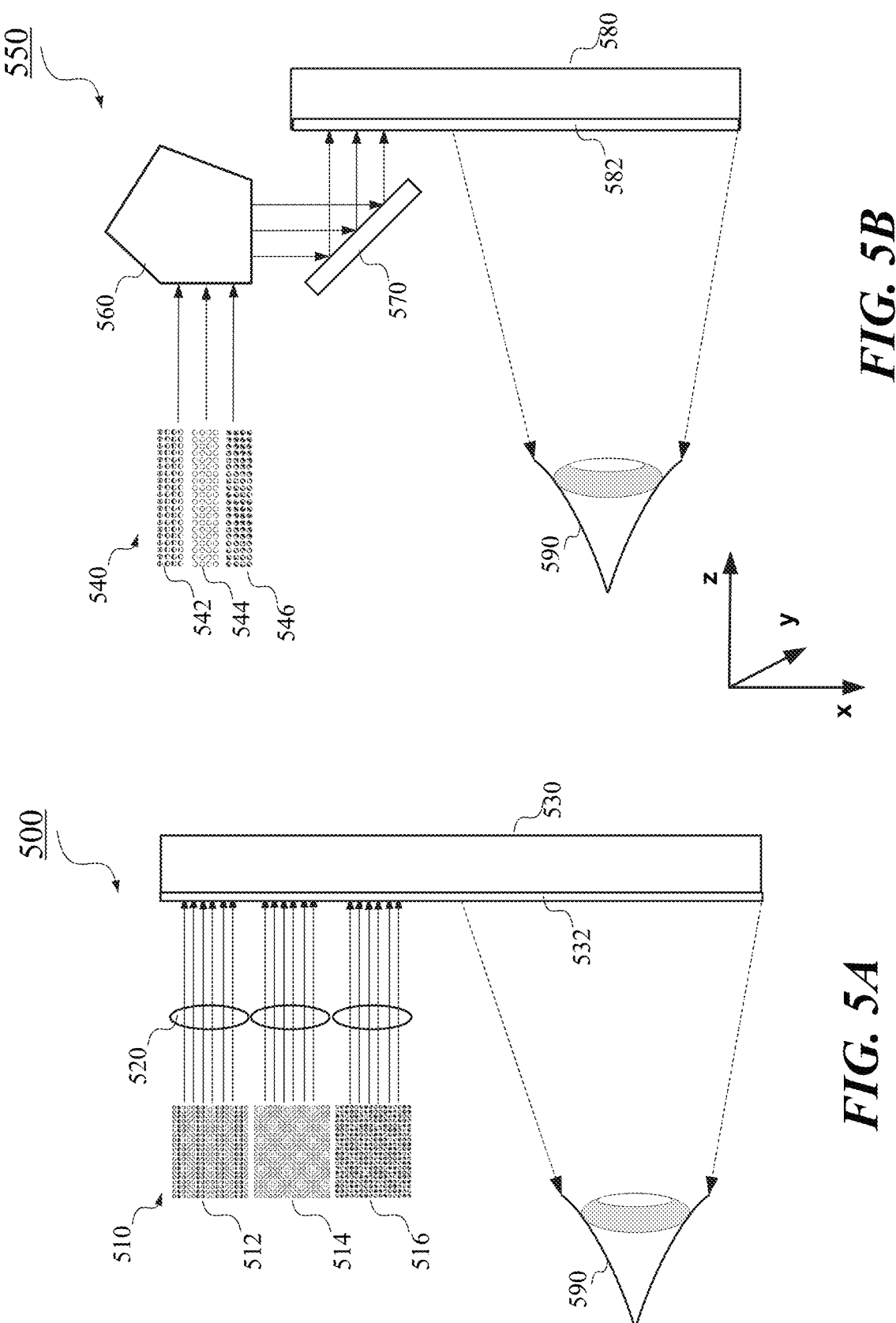
FIG. 5A illustrates an example of a near-eye display device including a waveguide display according to certain embodiments.
FIG. 5B illustrates another example of a near-eye display device including a waveguide display according to certain embodiments.

FIG. 5A illustrates an example of a near-eye display (NED) device 500 including a waveguide display 530 according to certain embodiments. NED device 500 may be an example of near-eye display 120, augmented reality system 400, or another type of display device. NED device 500 may include a light source 510, projection optics 520, and waveguide display 530. Light source 510 may include multiple panels of light emitters for different colors, such as a panel of red light emitters 512, a panel of green light emitters 514, and a panel of blue light emitters 516. The red light emitters 512 are organized into an array; the green light emitters 514 are organized into an array; and the blue light emitters 516 are organized into an array. The dimensions and pitches of light emitters in light source 510 may be small. For example, each light emitter may have a diameter less than 2 μm (e.g., about 1.2 μm) and the pitch may be less than 2 μm (e.g., about 1.5 μm). As such, the number of light emitters in each red light emitters 512, green light emitters 514, and blue light emitters 516 can be equal to or greater than the number of pixels in a display image, such as 960×720, 1280×720, 1440×1080, 1920×1080, 2160×1080, or 2560×1080 pixels. Thus, a display image may be generated simultaneously by light source 510. A scanning element may not be used in NED device 500.

Before reaching waveguide display 530, the light emitted by light source 510 may be conditioned by projection optics 520, which may include a lens array. Projection optics 520 may collimate or focus the light emitted by light source 510 to waveguide display 530, which may include a coupler 532 for coupling the light emitted by light source 510 into waveguide display 530. The light coupled into waveguide display 530 may propagate within waveguide display 530 through, for example, total internal reflection as described above with respect to FIG. 4. Coupler 532 may also couple portions of the light propagating within waveguide display 530 out of waveguide display 530 and towards user's eye 590.

FIG. 5B illustrates an example of a near-eye display (NED) device 550 including a waveguide display 580 according to certain embodiments. In some embodiments, NED device 550 may use a scanning mirror 570 to project light from a light source 540 to an image field where a user's eye 590 may be located. NED device 550 may be an example of near-eye display 120, augmented reality system 400, or another type of display device. Light source 540 may include one or more rows or one or more columns of light emitters of different colors, such as multiple rows of red light emitters 542, multiple rows of green light emitters 544, and multiple rows of blue light emitters 546. For example, red light emitters 542, green light emitters 544, and blue light emitters 546 may each include N rows, each row including, for example, 2560 light emitters (pixels). The red light emitters 542 are organized into an array; the green light emitters 544 are organized into an array; and the blue light emitters 546 are organized into an array. In some embodiments, light source 540 may include a single line of light emitters for each color. In some embodiments, light source 540 may include multiple columns of light emitters for each of red, green, and blue colors, where each column may include, for example, 1080 light emitters. In some embodiments, the dimensions and/or pitches of the light emitters in light source 540 may be relatively large (e.g., about 3-5 μm) and thus light source 540 may not include sufficient light emitters for simultaneously generating a full display image. For example, the number of light emitters for a single color may be fewer than the number of pixels (e.g., 2560×1080 pixels) in a display image. The light emitted by light source 540 may be a set of collimated or diverging beams of light.

Before reaching scanning mirror 570, the light emitted by light source 540 may be conditioned by various optical devices, such as collimating lenses or a freeform optical element 560. Freeform optical element 560 may include, for example, a multi-facets prism or another light folding element that may direct the light emitted by light source 540 towards scanning mirror 570, such as changing the propagation direction of the light emitted by light source 540 by, for example, about 90° or larger. In some embodiments, freeform optical element 560 may be rotatable to scan the light. Scanning mirror 570 and/or freeform optical element 560 may reflect and project the light emitted by light source 540 to waveguide display 580, which may include a coupler 582 for coupling the light emitted by light source 540 into waveguide display 580. The light coupled into waveguide display 580 may propagate within waveguide display 580 through, for example, total internal reflection as described above with respect to FIG. 4. Coupler 582 may also couple portions of the light propagating within waveguide display 580 out of waveguide display 580 and towards user's eye 590.

Scanning mirror 570 may include a microelectromechanical system (MEMS) mirror or any other suitable mirrors. Scanning mirror 570 may rotate to scan in one or two dimensions. As scanning mirror 570 rotates, the light emitted by light source 540 may be directed to a different areas of waveguide display 580 such that a full display image may be projected onto waveguide display 580 and directed to user's eye 590 by waveguide display 580 in each scanning cycle. For example, in embodiments where light source 540 includes light emitters for all pixels in one or more rows or columns, scanning mirror 570 may be rotated in the column or row direction (e.g., x or y direction) to scan an image. In embodiments where light source 540 includes light emitters for some but not all pixels in one or more rows or columns, scanning mirror 570 may be rotated in both the row and column directions (e.g., both x and y directions) to project a display image (e.g., using a raster-type scanning pattern).

NED device 550 may operate in predefined display periods. A display period (e.g., display cycle) may refer to a duration of time in which a full image is scanned or projected. For example, a display period may be a reciprocal of the desired frame rate. In NED device 550 that includes scanning mirror 570, the display period may also be referred to as a scanning period or scanning cycle. The light generation by light source 540 may be synchronized with the rotation of scanning mirror 570. For example, each scanning cycle may include multiple scanning steps, where light source 540 may generate a different light pattern in each respective scanning step.

In each scanning cycle, as scanning mirror 570 rotates, a display image may be projected onto waveguide display 580 and user's eye 590. The actual color value and light intensity (e.g., brightness) of a given pixel location of the display image may be an average of the light beams of the three colors (e.g., red, green, and blue) illuminating the pixel location during the scanning period. After completing a scanning period, scanning mirror 570 may revert back to the initial position to project light for the first few rows of the next display image or may rotate in a reverse direction or scan pattern to project light for the next display image, where a new set of driving signals may be fed to light source 540. The same process may be repeated as scanning mirror 570 rotates in each scanning cycle. As such, different images may be projected to user's eye 590 in different scanning cycles.

Figure 6:
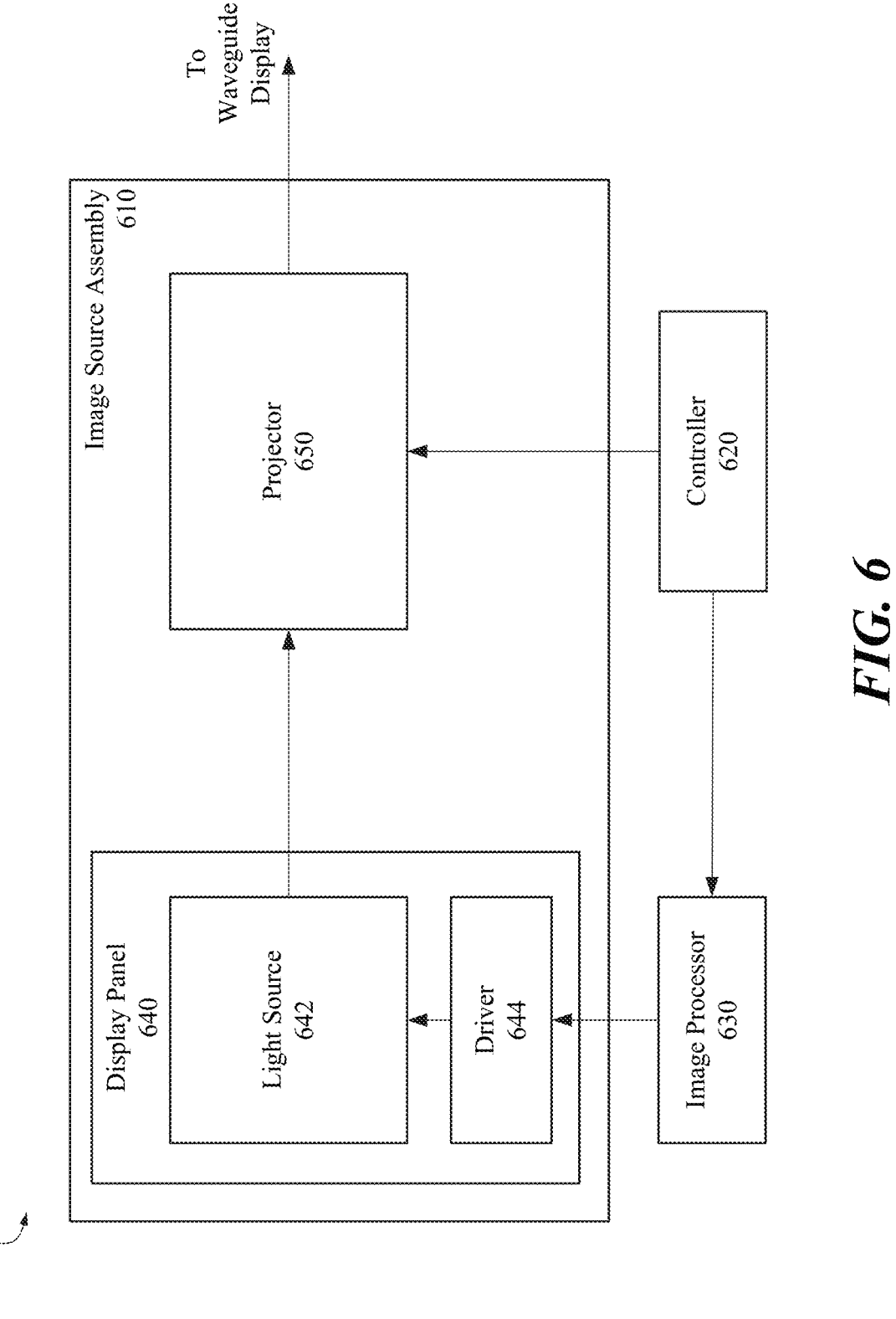
FIG. 6 illustrates an example of an image source assembly in an augmented reality system according to certain embodiments.

FIG. 6 illustrates an example of an image source assembly 610 in a near-eye display system 600 according to certain embodiments. Image source assembly 610 may include, for example, a display panel 640 that may generate display images to be projected to the user's eyes, and a projector 650 that may project the display images generated by display panel 640 to a waveguide display as described above with respect to FIGS. 4-5B. Display panel 640 may include a light source 642 and a driver circuit 644 for light source 642. Light source 642 may include, for example, light source 510 or 540. Projector 650 may include, for example, freeform optical element 560, scanning mirror 570, and/or projection optics 520 described above. Near-eye display system 600 may also include a controller 620 that synchronously controls light source 642 and projector 650 (e.g., scanning mirror 570). Image source assembly 610 may generate and output an image light to a waveguide display (not shown in FIG. 6), such as waveguide display 530 or 580. As described above, the waveguide display may receive the image light at one or more input-coupling elements, and guide the received image light to one or more output-coupling elements. The input and output coupling elements may include, for example, a diffraction grating, a holographic grating, a prism, or any combination thereof. The input-coupling element may be chosen such that total internal reflection occurs with the waveguide display. The output-coupling element may couple portions of the total internally reflected image light out of the waveguide display.

As described above, light source 642 may include a plurality of light emitters arranged in an array or a matrix. Each light emitter may emit monochromatic light, such as red light, blue light, green light, infra-red light, and the like. While RGB colors are often discussed in this disclosure, embodiments described herein are not limited to using red, green, and blue as primary colors. Other colors can also be used as the primary colors of near-eye display system 600. In some embodiments, a display panel in accordance with an embodiment may use more than three primary colors. Each pixel in light source 642 may include three subpixels that include a red LED, a green LED, and a blue LED, such as micro-LEDs, OLEDs, QDLEDs, QDEL devices, and PeLEDs. A semiconductor LED generally includes an active light emitting layer within multiple layers of semiconductor materials. The multiple layers of semiconductor materials may include different compound materials or a same base material with different dopants and/or different doping densities. For example, the multiple layers of semiconductor materials may include an n-type material layer, an active region that may include heterostructures (e.g., one or more quantum wells), and a p-type material layer. The multiple layers of semiconductor materials may be grown on a surface of a substrate having a certain orientation. In some embodiments, to increase light extraction efficiency, a mesa that includes at least some of the layers of semiconductor materials may be formed.

Controller 620 may control the image rendering operations of image source assembly 610, such as the operations of light source 642 and/or projector 650. For example, controller 620 may determine instructions for image source assembly 610 to render one or more display images. The instructions may include display instructions and scanning instructions. In some embodiments, the display instructions may include an image file (e.g., a bitmap file). The display instructions may be received from, for example, a console, such as console 110 described above with respect to FIG. 1. The scanning instructions may be used by image source assembly 610 to generate image light. The scanning instructions may specify, for example, a type of a source of image light (e.g., monochromatic or polychromatic), a scanning rate, an orientation of a scanning apparatus, one or more illumination parameters, or any combination thereof. Controller 620 may include a combination of hardware, software, and/or firmware not shown here so as not to obscure other aspects of the present disclosure.

In some embodiments, controller 620 may be a graphics processing unit (GPU) of a display device. In other embodiments, controller 620 may be other kinds of processors. The operations performed by controller 620 may include taking content for display and dividing the content into discrete sections. Controller 620 may provide to light source 642 scanning instructions that include an address corresponding to an individual source element of light source 642 and/or an electrical bias applied to the individual source element. Controller 620 may instruct light source 642 to sequentially present the discrete sections using light emitters correspond-ing to one or more rows of pixels in an image ultimately displayed to the user. Controller 620 may also instruct projector 650 to perform different adjustments of the light. For example, controller 620 may control projector 650 to scan the discrete sections to different areas of a coupling element of the waveguide display (e.g., waveguide display 580) as described above with respect to FIG. 5B. As such, at the exit pupil of the waveguide display, each discrete portion is presented in a different respective location. While each discrete section is presented at a different respective time, the presentation and scanning of the discrete sections occur fast enough such that a user's eye may integrate the different sections into a single image or series of images.

Image processor 630 may be a general-purpose processor and/or one or more application-specific circuits that are dedicated to performing the features described herein. In one embodiment, a general-purpose processor may be coupled to a memory to execute software instructions that cause the processor to perform certain processes described herein. In another embodiment, image processor 630 may be one or more circuits that are dedicated to performing certain fea-tures. While image processor 630 in FIG. 6 is shown as a stand-alone unit that is separate from controller 620 and driver circuit 644, image processor 630 may be a sub-unit of controller 620 or driver circuit 644 in other embodiments. In other words, in those embodiments, controller 620 or driver circuit 644 may perform various image processing functions of image processor 630. Image processor 630 may also be referred to as an image processing circuit.

In the example shown in FIG. 6, light source 642 may be driven by driver circuit 644, based on data or instructions (e.g., display and scanning instructions) sent from controller 620 or image processor 630. In one embodiment, driver circuit 644 may include a circuit panel that connects to and mechanically holds various light emitters of light source 642. Light source 642 may emit light in accordance with one or more illumination parameters that are set by the controller 620 and potentially adjusted by image processor 630 and driver circuit 644. An illumination parameter may be used by light source 642 to generate light. An illumination parameter may include, for example, source wavelength, pulse rate, pulse amplitude, beam type (continuous or pulsed), other parameter(s) that may affect the emitted light, or any combination thereof. In some embodiments, the source light generated by light source 642 may include multiple beams of red light, green light, and blue light, or any combination thereof.

Projector 650 may perform a set of optical functions, such as focusing, combining, conditioning, or scanning the image light generated by light source 642. In some embodiments, projector 650 may include a combining assembly, a light conditioning assembly, or a scanning mirror assembly. Pro-jector 650 may include one or more optical components that optically adjust and potentially re-direct the light from light source 642. One example of the adjustment of light may include conditioning the light, such as expanding, collimat-ing, correcting for one or more optical errors (e.g., field curvature, chromatic aberration, etc.), some other adjust-ments of the light, or any combination thereof. The optical components of projector 650 may include, for example, lenses, mirrors, apertures, gratings, or any combination thereof.

Projector 650 may redirect image light via its one or more reflective and/or refractive portions so that the image light is projected at certain orientations toward the waveguide dis-play. The location where the image light is redirected toward may depend on specific orientations of the one or more reflective and/or refractive portions. In some embodiments, projector 650 includes a single scanning mirror that scans in at least two dimensions. In other embodiments, projector 650 may include a plurality of scanning mirrors that each scan in directions orthogonal to each other. Projector 650 may perform a raster scan (horizontally or vertically), a bi-resonant scan, or any combination thereof. In some embodiments, projector 650 may perform a controlled vibra-tion along the horizontal and/or vertical directions with a specific frequency of oscillation to scan along two dimen-sions and generate a two-dimensional projected image of the media presented to user's eyes. In other embodiments, projector 650 may include a lens or prism that may serve similar or the same function as one or more scanning mirrors. In some embodiments, image source assembly 610 may not include a projector, where the light emitted by light source 642 may be directly incident on the waveguide display.

Figure 7A:
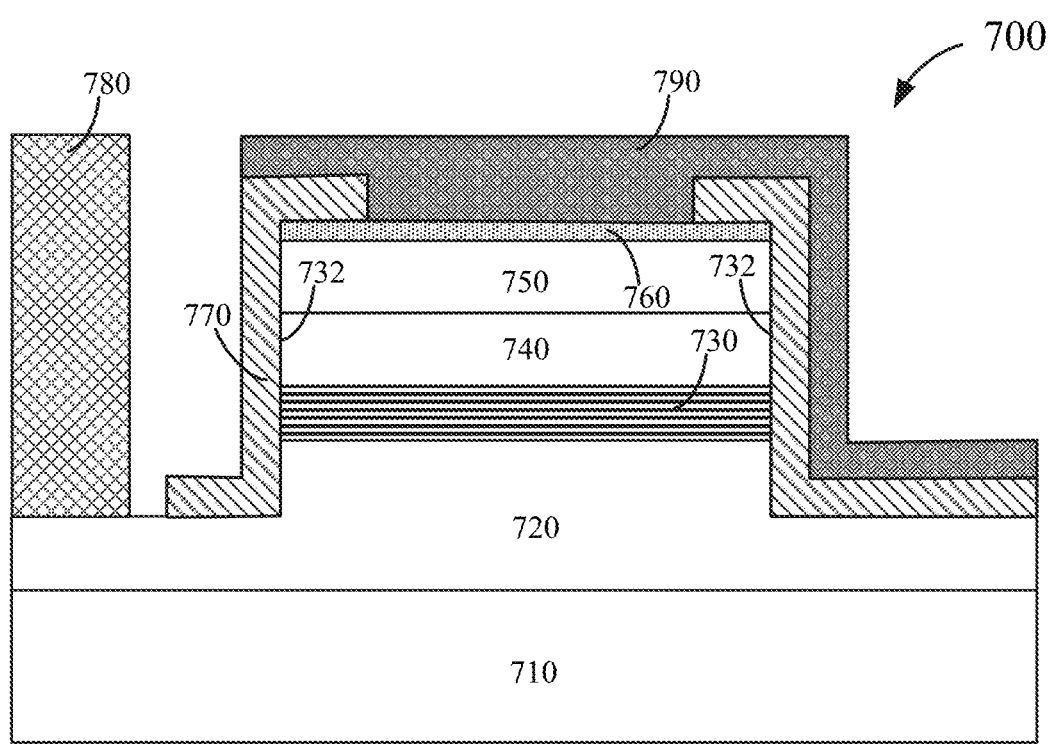
FIG. 7A illustrates an example of a light emitting diode (LED) having a vertical mesa structure according to certain embodiments.

FIG. 7A illustrates an example of an LED 700 having a vertical mesa structure. LED 700 may be a light emitter in light source 510, 540, or 642. LED 700 may be a micro-LED made of inorganic materials, such as multiple layers of semiconductor materials. The layered semiconductor light emitting device may include multiple layers of III-V semi-conductor materials. A III-V semiconductor material may include one or more Group III elements, such as aluminum (Al), gallium (Ga), or indium (In), in combination with a Group V element, such as nitrogen (N), phosphorus (P), arsenic (As), or antimony (Sb). When the Group V element of the III-V semiconductor material includes nitrogen, the III-V semiconductor material is referred to as a III-nitride material. The layered semiconductor light emitting device may be manufactured by growing multiple epitaxial layers on a substrate using techniques such as vapor-phase epitaxy (VPE), liquid-phase epitaxy (LPE), molecular beam epitaxy (MBE), or metalorganic chemical vapor deposition (MOCVD). For example, the layers of the semiconductor materials may be grown layer-by-layer on a substrate with a certain crystal lattice orientation (e.g., polar, nonpolar, or semi-polar orientation), such as a GaN, GaAs, or GaP substrate, or a substrate including, but not limited to, sap-phire, silicon carbide, silicon, zinc oxide, boron nitride, lithium aluminate, lithium niobate, germanium, aluminum nitride, lithium gallate, partially substituted spinels, or qua-ternary tetragonal oxides sharing the beta-$LiAlO_2$ structure, where the substrate may be cut in a specific direction to expose a specific plane as the growth surface.

In the example shown in FIG. 7A, LED 700 may include a substrate 710, which may include, for example, a sapphire substrate or a GaN substrate. A semiconductor layer 720 may be grown on substrate 710. Semiconductor layer 720 may include a III-V material, such as GaN, and may be p-doped (e.g., with Mg, Ca, Zn, or Be) or n-doped (e.g., with Si or Ge). One or more active layers 730 may be grown on semiconductor layer 720 to form an active region. Active layer 730 may include III-V materials, such as one or more InGaN layers, one or more AlInGaP layers, and/or one or more GaN layers, which may form one or more heterostruc-tures, such as one or more quantum wells or MQWs. A semiconductor layer 740 may be grown on active layer 730. Semiconductor layer 740 may include a III-V material, such as GaN, and may be p-doped (e.g., with Mg, Ca, Zn, or Be)

or n-doped (e.g., with Si or Ge). One of semiconductor layer 720 and semiconductor layer 740 may be a p-type layer and the other one may be an n-type layer. Semiconductor layer 720 and semiconductor layer 740 sandwich active layer 730 to form the light emitting region. For example, LED 700 may include a layer of InGaN situated between a layer of p-type GaN doped with magnesium and a layer of n-type GaN doped with silicon or oxygen. In some embodiments, LED 700 may include a layer of AlInGaP situated between a layer of p-type AlInGaP doped with zinc or magnesium and a layer of n-type AlInGaP doped with selenium, silicon, or tellurium.

In some embodiments, an electron-blocking layer (EBL) (not shown in FIG. 7A) may be grown to form a layer between active layer 730 and at least one of semiconductor layer 720 or semiconductor layer 740. The EBL may reduce the electron leakage current and improve the efficiency of the LED. In some embodiments, a heavily-doped semiconductor layer 750, such as a P$^+$ or P$^{++}$ semiconductor layer, may be formed on semiconductor layer 740 and act as a contact layer for forming an ohmic contact and reducing the contact impedance of the device. In some embodiments, a conductive layer 760 may be formed on heavily-doped semiconductor layer 750. Conductive layer 760 may include, for example, an indium tin oxide (ITO) or Al/Ni/Au film. In one example, conductive layer 760 may include a transparent ITO layer.

To make contact with semiconductor layer 720 (e.g., an n-GaN layer) and to more efficiently extract light emitted by active layer 730 from LED 700, the semiconductor material layers (including heavily-doped semiconductor layer 750, semiconductor layer 740, active layer 730, and semiconductor layer 720) may be etched to expose semiconductor layer 720 and to form a mesa structure that includes layers 720-760. The mesa structure may confine the carriers within the device. Etching the mesa structure may lead to the formation of mesa sidewalls 732 that may be orthogonal to the growth planes. A passivation layer 770 may be formed on sidewalls 732 of the mesa structure. Passivation layer 770 may include an oxide layer, such as a SiO$_2$ layer, and may act as a reflector to reflect emitted light out of LED 700. A contact layer 780, which may include a metal layer, such as Al, Au, Ni, Ti, or any combination thereof, may be formed on semiconductor layer 720 and may act as an electrode of LED 700. In addition, another contact layer 790, such as an Al/Ni/Au metal layer, may be formed on conductive layer 760 and may act as another electrode of LED 700.

When a voltage signal is applied to contact layers 780 and 790, electrons and holes may recombine in active layer 730, where the recombination of electrons and holes may cause photon emission. The wavelength and energy of the emitted photons may depend on the energy bandgap between the valence band and the conduction band in active layer 730. For example, InGaN active layers may emit green or blue light, AlGaN active layers may emit blue to ultraviolet light, while AlInGaP active layers may emit red, orange, yellow, or green light. The emitted photons may be reflected by passivation layer 770 and may exit LED 700 from the top (e.g., conductive layer 760 and contact layer 790) or bottom (e.g., substrate 710).

In some embodiments, LED 700 may include one or more other components, such as a lens, on the light emission surface, such as substrate 710, to focus or collimate the emitted light or couple the emitted light into a waveguide. In some embodiments, an LED may include a mesa of another shape, such as planar, conical, semi-parabolic, or parabolic, and a base area of the mesa may be circular, rectangular, hexagonal, or triangular. For example, the LED may include a mesa of a curved shape (e.g., paraboloid shape) and/or a non-curved shape (e.g., conic shape). The mesa may be truncated or non-truncated.

Figure 7B:
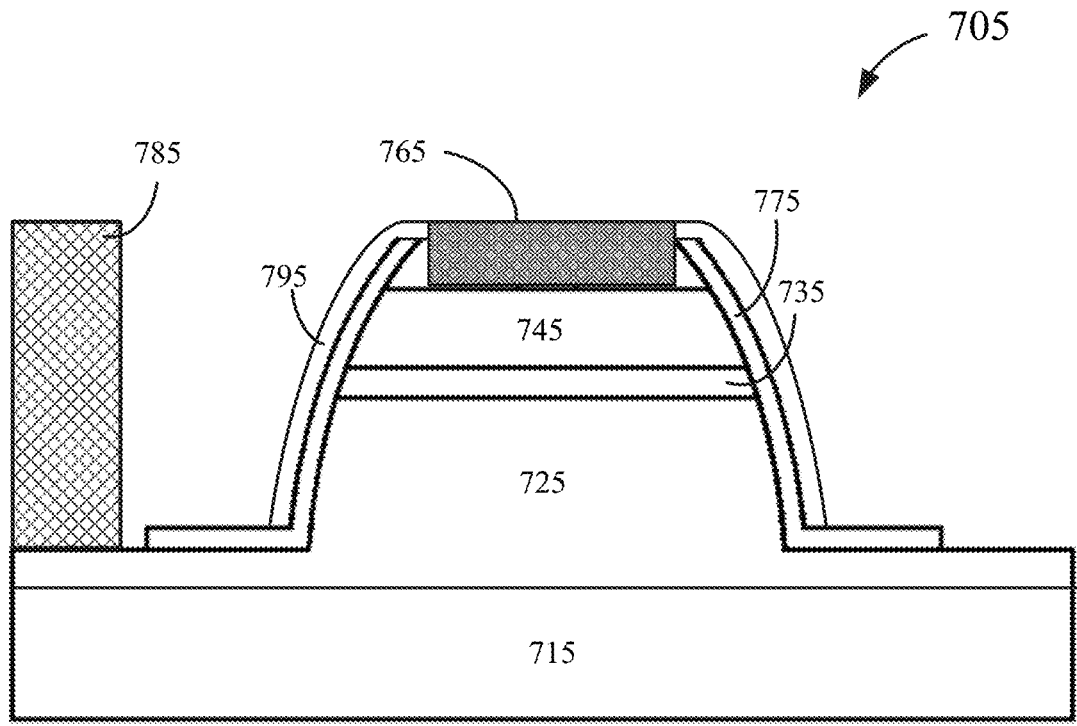
FIG. 7B is a cross-sectional view of an example of an LED having a parabolic mesa structure according to certain embodiments.

FIG. 7B is a cross-sectional view of an example of an LED 705 having a parabolic mesa structure. Similar to LED 700, LED 705 may include multiple layers of semiconductor materials, such as multiple layers of III-V semiconductor materials. The semiconductor material layers may be epitaxially grown on a substrate 715, such as a GaN substrate or a sapphire substrate. For example, a semiconductor layer 725 may be grown on substrate 715.

Semiconductor layer 725 may include a III-V material, such as GaN, and may be p-doped (e.g., with Mg, Ca, Zn, or Be) or n-doped (e.g., with Si or Ge). One or more active layer 735 may be grown on semiconductor layer 725. Active layer 735 may include III-V materials, such as one or more InGaN layers, one or more AlInGaP layers, and/or one or more GaN layers, which may form one or more heterostructures, such as one or more quantum wells. A semiconductor layer 745 may be grown on active layer 735. Semiconductor layer 745 may include a III-V material, such as GaN, and may be p-doped (e.g., with Mg, Ca, Zn, or Be) or n-doped (e.g., with Si or Ge). One of semiconductor layer 725 and semiconductor layer 745 may be a p-type layer and the other one may be an n-type layer.

To make contact with semiconductor layer 725 (e.g., an n-type GaN layer) and to more efficiently extract light emitted by active layer 735 from LED 705, the semiconductor layers may be etched to expose semiconductor layer 725 and to form a mesa structure that includes layers 725-745. The mesa structure may confine carriers within the injection area of the device. Etching the mesa structure may lead to the formation of mesa side walls (also referred to herein as facets) that may be non-parallel with, or in some cases, orthogonal, to the growth planes associated with crystalline growth of layers 725-745.

As shown in FIG. 7B, LED 705 may have a mesa structure that includes a flat top. A dielectric layer 775 (e.g., SiO$_2$ or SiNx) may be formed on the facets of the mesa structure. In some embodiments, dielectric layer 775 may include multiple layers of dielectric materials. In some embodiments, a metal layer 795 may be formed on dielectric layer 775. Metal layer 795 may include one or more metal or metal alloy materials, such as aluminum (Al), silver (Ag), gold (Au), platinum (Pt), titanium (Ti), copper (Cu), or any combination thereof. Dielectric layer 775 and metal layer 795 may form a mesa reflector that can reflect light emitted by active layer 735 toward substrate 715. In some embodiments, the mesa reflector may be parabolic-shaped to act as a parabolic reflector that may at least partially collimate the emitted light.

Electrical contact 765 and electrical contact 785 may be formed on semiconductor layer 745 and semiconductor layer 725, respectively, to act as electrodes. Electrical contact 765 and electrical contact 785 may each include a conductive material, such as Al, Au, Pt, Ag, Ni, Ti, Cu, or any combination thereof (e.g., Ag/Pt/Au or Al/Ni/Au), and may act as the electrodes of LED 705. In the example shown in FIG. 7B, electrical contact 785 may be an n-contact, and electrical contact 765 may be a p-contact. Electrical contact 765 and semiconductor layer 745 (e.g., a p-type semiconductor layer) may form a back reflector for reflecting light emitted by active layer 735 back toward substrate 715. In some embodiments, electrical contact 765 and metal layer 795 include same material(s) and can be formed using the same processes. In some embodiments, an additional conductive layer (not shown) may be included as an intermediate conductive layer between the electrical contacts 765 and 785 and the semiconductor layers.

When a voltage signal is applied across electrical contacts 765 and 785, electrons and holes may recombine in active layer 735. The recombination of electrons and holes may cause photon emission, thus producing light. The wavelength and energy of the emitted photons may depend on the energy bandgap between the valence band and the conduction band in active layer 735. For example, InGaN active layers may emit green or blue light, while AlInGaP active layers may emit red, orange, yellow, or green light. The emitted photons may propagate in many different directions, and may be reflected by the mesa reflector and/or the back reflector and may exit LED 705, for example, from the bottom side (e.g., substrate 715) shown in FIG. 7B. One or more other secondary optical components, such as a lens or a grating, may be formed on the light emission surface, such as substrate 715, to focus or collimate the emitted light and/or couple the emitted light into a waveguide.

As described above, the overall efficiency of a waveguide-based display system may be the product of the efficiency of individual components in the display system and may also depend on how the components are coupled together. In a simplified example, the overall efficiency $\eta_{tot}$ of a waveguide-based display system may be determined as $\eta_{tot} = \eta_{EQE} \times \eta_{in} \times \eta_{out}$, where $\eta_{EQE}$ is the external quantum efficiency of an LED, $\eta_{in}$ is the in-coupling efficiency of display light from the LED into the waveguide, and $\eta_{out}$ is the out-coupling efficiency of the display light from the waveguide towards the user's eye. Thus, the overall efficiency $\eta_{tot}$ can be improved by improving one or more of $\eta_{EQE}$, $\eta_{in}$, and $\eta_{out}$. In some near-eye display systems, light from the light sources may be projected by display optics (e.g., a lens) to user's eyes, where the overall efficiency may be determined by the EQE of each light source and the efficiency of the display optics for collecting and directing the emitted light to the eyebox.

In LEDs and some other light sources, such as micro-LEDs, OLEDs, QDLEDs, QDEL devices, and PeLEDs, photons are usually generated at a certain internal quantum efficiency (IQE) through the recombination of electrons and holes within an active region (e.g., one or more semiconductor layers), where the internal quantum efficiency is the proportion of the radiative electron-hole recombination in the active region that emits photons. The generated light may then be extracted from the LEDs in a particular direction or within a particular solid angle. The ratio between the number of emitted photons extracted from an LED and the number of electrons passing through the LED is referred to as the external quantum efficiency (EQE), which describes how efficiently the LED converts injected electrons to photons that are extracted from the device. The external quantum efficiency may be proportional to the injection efficiency, the internal quantum efficiency, and the light extraction efficiency (LEE). The injection efficiency refers to the proportion of electrons passing through the device that are injected into the active region. The light extraction efficiency is the proportion of photons generated in the active region that escape from the device. For LEDs, and in particular, micro-LEDs with reduced physical dimensions, improving the internal and external quantum efficiency and/or controlling the emission spectrum may be challenging.

The internal quantum efficiency may indicate the proportion of the radiative electron-hole recombination in the active region that emits photons. The internal quantum efficiency of LEDs may depend on the relative rates of competitive radiative (light producing) recombination and non-radiative (lossy) recombination that occur in the active region of the LEDs. Non-radiative recombination processes in the active region may include Shockley-Read-Hall (SRH) recombination at defect sites and eeh/ehh Auger recombination that involves three carriers. The internal quantum efficiency of an LED may be approximately determined by:

$$IQE = \frac{BN^2}{AN + BN^2 + CN^3},$$

where A, B and C are the rates of SRH recombination, bimolecular (radiative) recombination, and Auger recombination, respectively, and N is the charge-carrier density (i.e., charge-carrier concentration) in the active region.

While the Auger recombination due to a high current density (and high charge carrier density) may be an intrinsic process depending on material properties, non-radiative SRH recombination depends on the characteristics and the quality of material, such as the defect density in the active region. As described above, LEDs may be fabricated by etching mesa structures into the active emitting layers to confine carriers within the mesa structures of the individual LEDs and to expose the n-type material beneath the active emitting layers for electrical contact. When mesa structures are etched (e.g., using high-energy ions such as $Ar^+$, $Cl_2^+$, $Cl^+$, or $HF^+$) to isolate individual LEDs, the facets of the mesa structure, such as mesa sidewalls 732, may include some defects, such as lattice dislocations, dangling bonds, pores, grain boundaries, vacancies, surface oxides, surfaces modified by plasma atoms, interstitial defects, substitutional defects, inclusion of precipitates, and the like. The defects may create energy levels that otherwise would not exist within the bandgap of the semiconductor material, causing non-radiative electron-hole recombination at or near the facets of the mesa structure. Thus, these imperfections may become the recombination centers where electrons and holes may be confined until they combine non-radiatively. Therefore, the active region in proximity to the exposed sidewalls may have a higher rate of non-radiative SRH recombination, thereby reducing the efficiency of the resulting LED. Due to the small size of the mesa structure, a larger proportion of the injected carriers may diffuse to regions near the mesa sidewalls and may be subjected to a higher non-radiative recombination rate. This may cause the peak efficiency of the LED to decrease significantly and/or cause the peak efficiency operating current to increase.

The external quantum efficiency may also be affected by the efficiency of extracting light from the image source. For example, at the light-emitting surface of an LED, such as the interface between the LED and air, incident light with incident angles greater than a critical angle may be reflected back to the LED due to total internal reflection (TIR). Because of the geometry of the LED, some light reflected back to the LED may be trapped and eventually be absorbed by the LED. For example, some trapped light may be absorbed by the semiconductor materials to generate electron-hole pairs, which may recombine radiatively or non-radiatively. Some trapped light may be absorbed by metals (e.g., metal contacts or reflectors) at the bottom and/or sidewalls of the LED due to, for example, surface plasmon resonance that may be excited by p-polarized light at the interface between a metal layer and a dielectric layer (e.g., the passivation layer). Because of the high refractive indices of many III-V semiconductor materials (e.g., about 2.4 for GaN, and greater than about 3.0 for GaP, InP, GaInP, and AlGaInP), the critical angle for total internal reflection at the interface between the III-V semiconductor material and an adjacent lower refractive index material (e.g., air or a dielectric) may be small. As such, a large portion of the light emitted in the active region of a III-V material-based LED may be trapped in the LED due to TIR and may eventually be absorbed by the LED. Therefore, the LEE of the micro-LED may be low.

The light coupling efficiencies and the uniformity of the light coupling efficiencies for light sources in an array of light sources in a display system may also be affected by the beam profile of the light beam emitted by the light sources. For example, for a display system with a limited acceptance angle (e.g., within ±20°), if the light beam emitted by a light emitter (e.g., micro-LED) has a wide beam profile (e.g., a Lambertian emission profile), only a small fraction of the total light emitted by the light emitter may be captured by the display optics and delivered to the user's eyes.

Figures 8A, 8B, 8C:
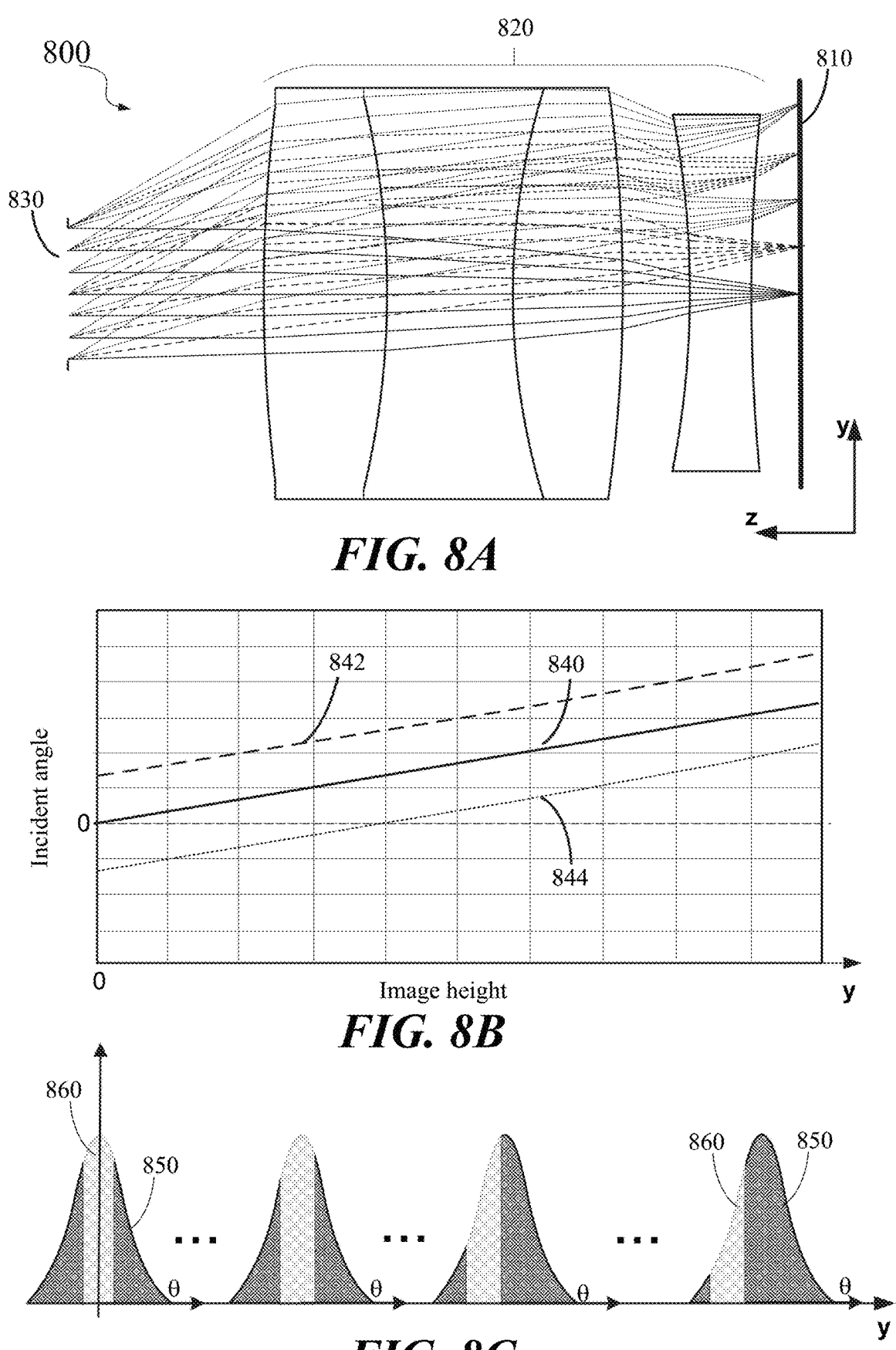
FIG. 8A illustrates an example of a display system including an array of light sources and display optics.
FIG. 8B illustrates examples of the incident angles of light beams emitted by the array of light sources and collected by the display optics of FIG. 8A.
FIG. 8C illustrates examples of the portions of the light beams emitted by the array of light sources of FIG. 8A that may be collected and projected by the display optics to user's eyes.

FIG. 8A illustrates an example of a display system 800 including an array of light sources 810 and display optics 820. FIG. 8B illustrates examples of the incident angles of light beams emitted by the array of light sources 810 and collected by display optics 820 of FIG. 8A. The array of light sources 810 may include, for example, a one dimensional or two-dimensional array of micro-LEDs, OLEDs, QLEDs, QDEL devices, or PeLEDs. As shown in FIG. 8A, due to the limited field of view (or acceptance angle) and the size of an exit pupil 830 (or eyebox) of display system 800, different angular portions of the light emitted by respective light sources in the array of light sources 810 may pass through exit pupil 830 of display system 800. For example, as shown by a line 840 in FIG. 8B, the chief ray from a light source at the center of the array of light sources 810 may be incident on display optics 820 at about 0°, while the chief ray from a light source at an edge of the array of light sources 810 may be incident on display optics 820 at, for example, about 20° or a larger angle. Lines 842 and 844 show the angular range of the light emitted by each light source at a respective height in the array of light sources 810 that can reach the user's eyes. When the light intensity of the light beam from each light source is not uniform in all directions (such as having a Gaussian beam profile), light from different light sources may be projected to the user's eyes at different efficiencies due to the different angular portions of light from the respective light sources in the array of light sources 810 that can pass through exit pupil 830.

FIG. 8C illustrates examples of the portions of light beams emitted the array of light sources 810 that may be collected and projected by display optics 820 to user's eyes. As described above, the beam profile 850 of the light beam emitted from each light source in the array of light sources 810 may have a certain FWHM angular range (e.g., about ±15°, about ±20°, or larger). Due to the limited acceptance angles (e.g., less about ±20°, about ±18.5°) and the limited size of the exit pupil of display system 800, only a portion of each light beam may reach a user's eye through display optics 820. In addition, due to the different chief ray angles from different light sources in the array of light sources 810 described above, the portion of each light beam that can reach the user's eyes may be within a different respective angular range for each respective light source as shown in FIGS. 8A and 8C. The total power of the light beam emitted by each light source may be indicated by the total area under a beam profile 850 that represents the brightness (or intensity) profile of the light beam as a function of the emission angle. The total power of each light beam that may reach the user's eye may be indicated by the total area of a bright region 860 under beam profile 850, which may only be a portion of the total area under beam profile 850. For light sources at the center (e.g., y=0) of the array of light sources 810, the area of bright region 860 may be a large portion of the total area below beam profile 850 because light with small emission angles may be collected by display optics 820 and the light beam has higher intensities at small emission angles. As such, the coupling efficiencies may be high for light sources at the center of the array of light sources 810. However, for light sources at the edges of the array of light sources 810, the area of bright region 860 may only be a small portion of the total area below beam profile 850 as shown in FIG. 8C because only light with large emission angles may be collected by display optics 820 and the light beam has lower intensities at large emission angles. In other words, the area of bright region 860, and thus the coupling efficiency of the light sources in the array of light sources 810, may decrease significantly from the center to the edges of the array of light sources 810. This effect may be referred to as the Brightness-Roll-Off (BRO) effect.

In some embodiments, to improve the efficiency of extracting light from the light source (and thus the external quantum efficiency) and the efficiency of coupling the extracted light to user's eye, one or more other optical components (e.g., a micro-lens), in addition to the mesa structure and reflector described above, may be formed on the light emission surface, such as substrate 710 or 715, to extract the emitted light within a certain solid angle out of an LED, and/or to focus or collimate the emitted light. For example, in some embodiments, a micro-lens array may be formed on an array of light sources, where the light emitted from each light source may be collected and extracted by a corresponding micro-lens, and may be collimated, focused, or expanded, and then directed to a waveguide in a wave-guide-based display system. The micro-lenses may help to reduce the total internal reflection at the light emitting surface, and modify the beam profiles of (e.g., collimating) the light beams emitted by the array of light emitters.

However, when the emission angles of light emitters in an array of light emitters are uniformly controlled (e.g., collimated and propagating in the same direction), light emitted by the light emitters may not be uniformly collected and delivered to the eyebox of the display system. For example, light emitted by light emitters near edges of the array of light emitters may be collected and delivered to the eyebox of the display system at lower efficiencies than light emitted by light emitters at the center of the array of light emitters, which may cause non-uniform intensity or brightness variation in the displayed images. In some embodiments, to improve the coupling efficiency of display light from the light sources into user's eyes through a waveguide-based display system, it may be desirable that the light from each light source is directed to the waveguide at a different respective angle. The light emitted from the light sources can be redirected to desired directions using, for example, micro-lenses, wedges or prisms, gratings, or the like.

Figure 9:
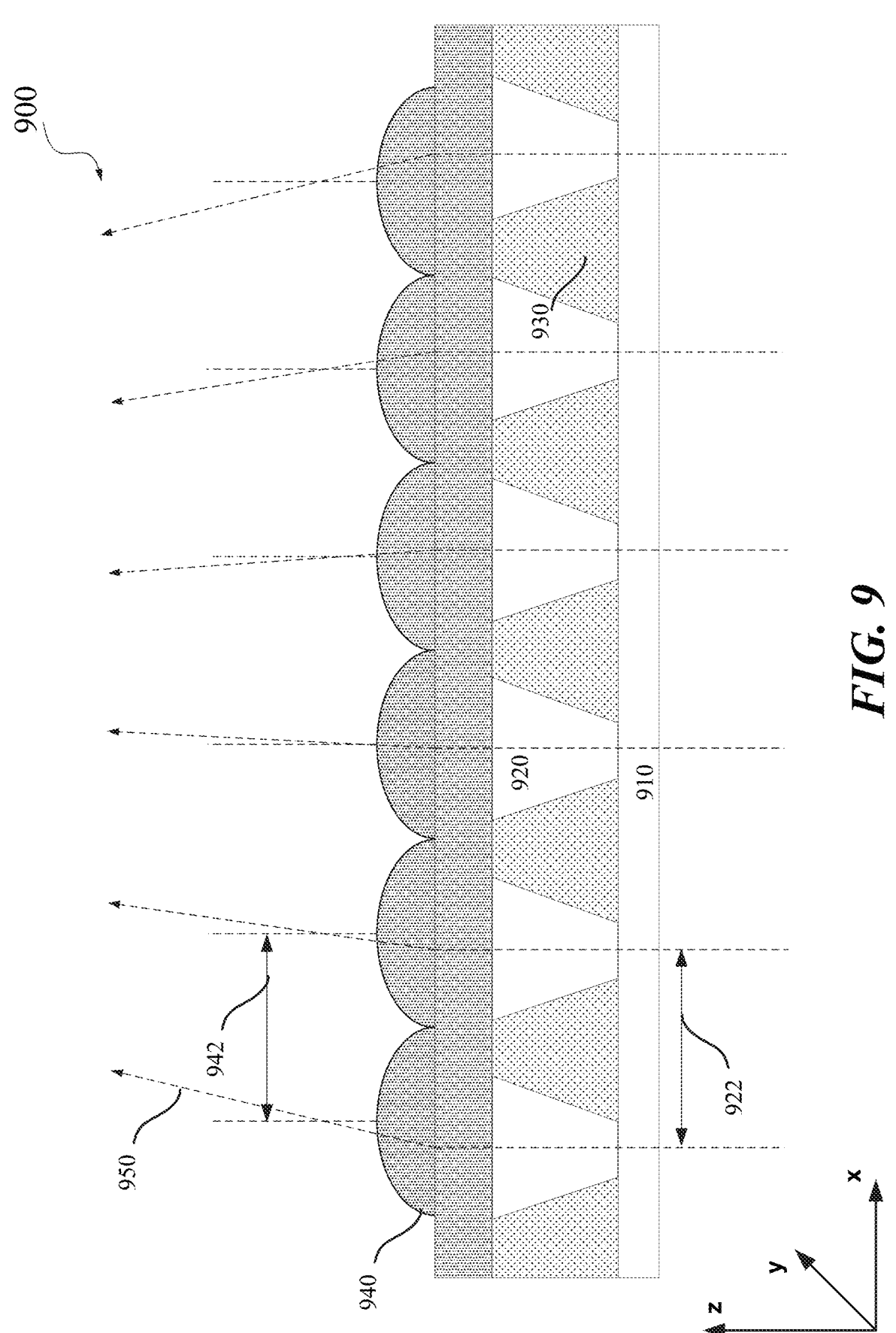
FIG. 9 illustrates an example of a device including an array of light sources and an array of micro-lenses for extracting and deflecting light from the array of light sources according to certain embodiments.

FIG. 9 illustrates an example of a device 900 including an array of light sources 920 and a micro-lens array 940 for extracting and deflecting light from the array of light sources 920 according to certain embodiments. The array of light sources 920 may include a one-dimensional or two-dimensional array of light sources, where the light sources may be uniformly distributed and may be separated by, for example, insulators 930, conductors, or any combinations of conductors and insulators. In some embodiments, the array of light sources 920 may include micro-LED epitaxial structures formed on a substrate 910 as described above with respect to, for example, FIGS. 7A and 7B. Insulators 930 may include, for example, passivation layers (e.g., passivation layer 770), light reflection layers, filling materials (e.g., polymers), and the like.

Micro-lens array 940 may be formed directly on the array of light sources 920 or may be formed on a substrate and then bonded to the array of light sources 920. For example, micro-lens array 940 may be etched in a dielectric layer or a semiconductor layer of the array of light sources 920, such as a substrate or an oxide layer (e.g., a $SiO_2$ layer) of the array of light sources 920, or may be formed on a dielectric layer deposited on the array of light sources 920, such as an oxide layer or a polymer layer, as described in detail below. The focal length and the distance of the micro-lenses from the corresponding light sources may be configured such that light beam from each micro-lens may be a collimated beam, a converging beam, or a diverging beam.

A pitch 922 of the array of light sources 920 may be different from (e.g., less than or greater than) a pitch 942 of micro-lens array 940, and thus the optical axis of each micro-lens in micro-lens array 940 may be offset from the center of a respective light source in the array of light sources 920 by a different distance. As such, the light beam from each light source may be deflected by the corresponding micro-lens by a different respective deflection angle. In the example shown in FIG. 9, pitch 922 of the array of light sources 920 may be greater than pitch 942 of micro-lens array 940, and thus the optical axis of each micro-lens in micro-lens array 940 may be offset from the center of a respective light source in the array of light sources 920 by a different distance. The offset may be a function of the location of the micro-lens. For example, the offset may linearly increase as a function of the distance of the micro-lens from the center of device 900, and thus the deflection angle of the light beam of a light source by a corresponding micro-lens may gradually increase as the distance of the light source from the center of the array of light sources 920 increases. As a result, the light beams from the light sources may be deflected by the corresponding micro-lenses to different directions as shown by lines 950 and may converge as shown in the example. Therefore, the peak luminance directions of the light beams from different light sources after passing through the corresponding micro-lenses may be different, and may match or close to the chief ray angles for the respective light sources.

Because of the peak luminance direction modification by micro-lens array 940, the portion of the light that may reach the user's eyes from each light source in the array of light sources 920 may be substantially the same, which may be the portion of the light beam that has the highest intensity or brightness. Therefore, both the coupling efficiencies and the uniformity of the coupling efficiencies may be improved for the light sources in the array of light sources 920.

In various embodiments, the pitch of micro-lens array may be uniform or non-uniform. For example, the pitch of a two-dimensional micro-lens array may be uniform in two orthogonal directions, uniform in one direction only, or non-uniform in both directions. The pitch may also be the same or different in the two orthogonal directions. The pitch of the micro-lens array may be different from the pitch of the array of light sources in one or two dimensions.

Redirecting the emitted light using off-centered micro-lenses or micro-prisms for some light sources may require a precise pixel-level alignment (and thus may be difficult to manufacture), and may have limited deflection angle due to certain geometry limitations. For example, when the offset between a light source and the corresponding micro-lens is large such that a portion of the micro-lens may be on an adjacent light source, the micro-lens may deflect the light beams from the light source and the adjacent light source to opposite directions. In addition, the micro-lenses and micro-prisms may have chromatic aberrations that may reduce image quality.

Figures 10A, 10B:
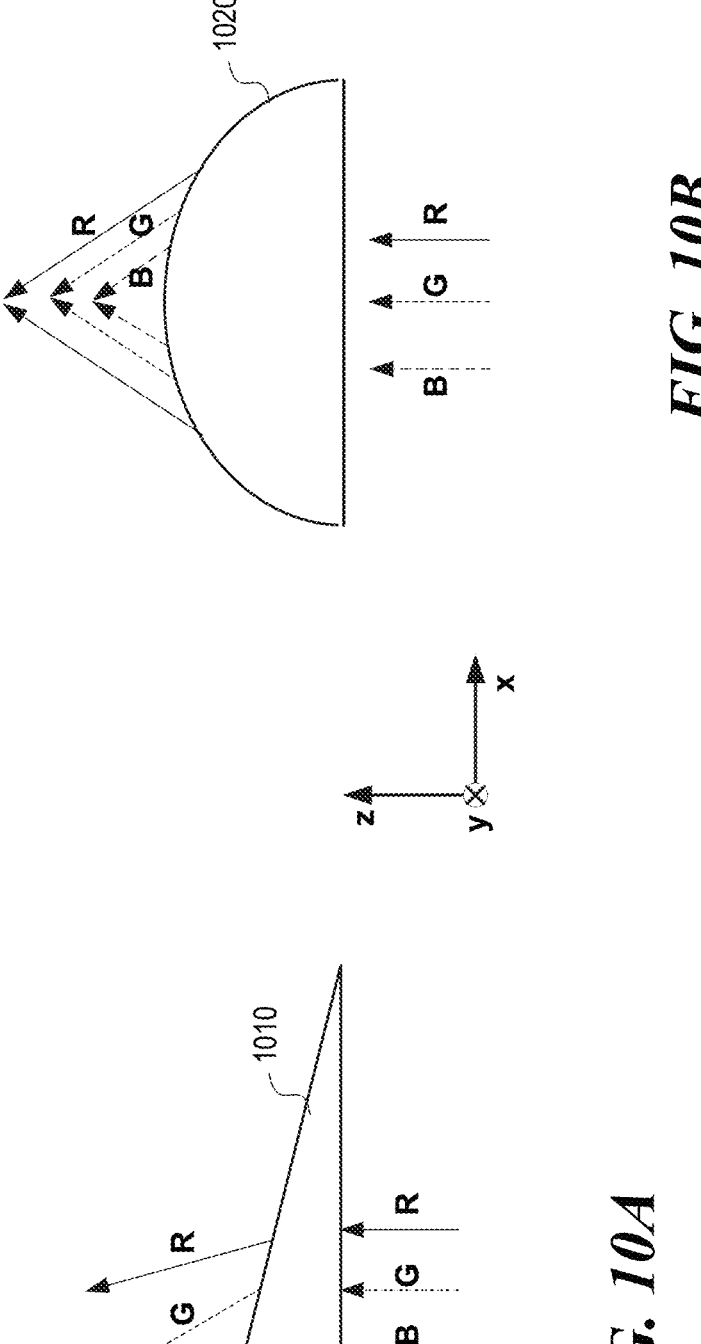
FIG. 10A illustrates an example of light dispersion by a refractive light deflection optical component (e.g., a prism).
FIG. 10B illustrates an example of light dispersion by a refractive light focusing optical component (e.g., a lens).

FIG. 10A illustrates an example of light dispersion by a refractive light deflection optical component (e.g., a prism 1010). In the illustrated example, prism 1010 may include a material (e.g., glass) that has normal dispersion. Thus, the refractive index of prism 1010 for red light (having a longer wavelength) may be smaller than the refractive index for blue light. As such, for surface-normal incident light, the refraction angle of the light refracted out of prism 1010 at the glass/air interface may be smaller for red light than for blue light. Therefore, surface-normal incident light of different colors may be refracted out of prism 1010 at different angles, which may be useful for some applications (e.g., wavelength division demultiplexing) but may cause chromatic aberrations that may reduce image quality in a display system.

FIG. 10B illustrates an example of light dispersion by a refractive light focusing optical component (e.g., a lens 1020). Lens 1020 may include a material (e.g., glass) that has normal dispersion. Thus, the refractive index of lens 1020 for red light may be smaller than the refractive index for blue light. Therefore, as prism 1010 in FIG. 10A, lens 1020 may bend blue light at a larger angle than red light, such that blue light may focus at a shorter distance than red light. As such, light of different colors may have the best focus at different image planes, which may cause chromatic aberrations that may reduce the image quality.

There may be several methods to correct the overall chromatic aberrations of an optical system. In a digital compensation method, the chromatic aberration of a display system may be reduced by preprocessing images according to the chromatic dispersion of the optics, at the cost of extra graphic computation power. The digital chromatic correction may help to decrease but may not completely eliminate chromatic aberrations because each color channel may have a certain spectral bandwidth, rather than a single wavelength. Conventional optical chromatic correction techniques may utilize two or more refractive optical elements (e.g., lenses or prisms) made of materials with different refractive index dispersion characteristics (or Abbe numbers) in a same system to compensate the chromatic aberrations, which may increase the size, weight, and cost of the system. Chromatic aberrations may also be reduced using a diffractive optical element (which may have a negative Abbe number) and a refractive optical element. Systems employing these method may have lower chromatic aberrations, but may have large form factors, higher weights, and higher costs, and thus may not be suitable for near-eye displays.

According to certain embodiments, achromatic beam deflectors that can achieve large deflection angles for a large range of incident angles may be used to extract and redirect light emitted from light sources to user's eyes. The achromatic beam deflectors may include one or more layers of subwavelength structures (hereinafter "metasurfaces" or "meta-structures"). The achromatic beam deflector may achieve a spatially varying deflection angle over its area such that the light emitted from all or a majority of light source of a display panel can be redirected towards the eyebox. The achromatic beam deflectors can allow light in multiple color bands to be deflected by the same or similar angles (e.g., with differences less than about 5%, 2%, or 1%). The achromatic beam deflectors can be either polarization independent or polarization selective depending on the light source property. Other functionalities can also be integrated into the metasurfaces through designs of individual meta-elements or the arrangement of different meta-elements. For example, the metasurface may be designed to both collimate (or focus) the emitted light (to modify the emission angle of each light source) and deflect the emitted light.

A metasurface may include a dense arrangement of sub-wavelength nanostructures that may resonate to modify the phase, amplitude, and/or polarization of incident light by desired values. The modification of the wavefront may be tuned by tuning the material (e.g., dielectric, semiconductor, or metallic materials), size (e.g., diameter or side), geometry (e.g., cylinder or rectangular prism), spatial arrangement (e.g., pitch), orientation (e.g., rotation angle), and environment (e.g., filling material) of the nanostructures and thus the resonant condition of the nanostructures, to achieve various flat optical devices, such as blazed gratings, lenses, polarizers, wave plates, holograms, cubic lenses, Alvarez lenses with tunable focal length, and non-imaging optics (e.g., for cloaking). Metasurfaces can provide continuous control of the phase profile (e.g., from 0 to $2\pi$) using two thickness (or height) levels and different cross-sectional shapes and/or areas, and can reduce high diffraction orders while maintaining the advantages of small size, low weight, and ease of fabrication of planar diffractive optics. Metasurfaces may also be designed to achieve achromatic behavior at multiple wavelengths.

A desired function (e.g., focusing or beam steering/deflecting) of a metasurface may be achieved by constructive interference between multiple wavelets from multiple light paths, where the total phase delay $\varphi_{tot}$ of each wavelet at the point (or plane) of interest may be the sum of a phase shift $\varphi_m(x, \lambda)$ introduced by the metasurface at a corresponding point x of the metasurface and a phase $\varphi_p(x, \lambda)$ accumulated during propagation from the point x of the metasurface to the point (or plane) of interest, such as a focal point or a plane perpendicular to a certain direction. To achieve achromatic behavior (e.g., a deflection angle or focal length independent of wavelength), the condition (e.g., focal point or deflection direction) for constructive interference needs to be preserved for different wavelengths.

In some embodiments, to design a metasurface for a certain function, Fourier optics may be used to determine the desired phase delay profile that can produce the desired light field distribution in a field of interest. For example, for a blazed grating, a phase delay profile with a linear dependence on the position may be needed, where the phase delay may increase or decrease by $2\pi$ across one grating period. The desired phase delay profile may then be discretized into segments with discrete phases. Each discrete phase delay for a corresponding segment of the discretized phase delay profile may be achieved using a corresponding nanostructure (or nanostructures) by tuning the parameters of the nanostructure, such as the size, shape (or geometry), material, orientation, and the like as described above and below.

Figure 11:
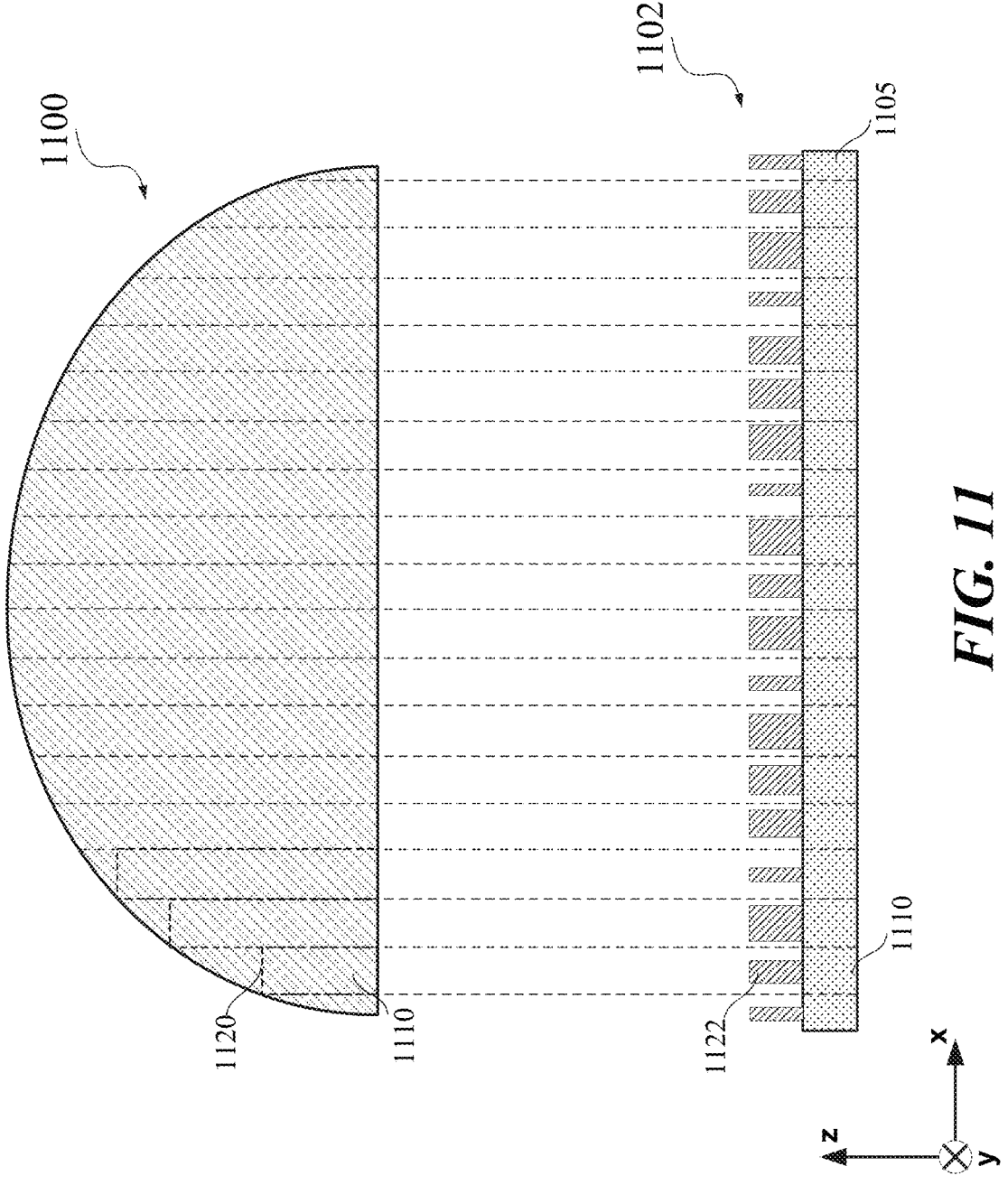
FIG. 11 illustrates an example of achieving the phase delay profile of a refractive lens using a flat lens (e.g., a meta-lens) according to certain embodiments.

FIG. 11 illustrates an example of achieving the phase delay profile of a refractive lens 1100 using a flat lens 1102 (also referred to as a meta-lens) according to certain embodiments. For a spherical lens, the total phase delay $\varphi_{tot}$ of each wavelet at a focal point may be the sum of the phase shift introduced by the lens at a corresponding point (x, y) and the phase accumulated during propagation from the point (x, y)

of the lens to the focal point. Thus, the target phase shift $\varphi_m(x, y, \lambda)$ introduced by a lens with a focal length f at a point (x, y) for each wavelength $\lambda$ may be described by:

$$\varphi_m(x, y, \lambda) = -\frac{2\pi}{\lambda}\left(\sqrt{x^2 + y^2 + f^2} - f\right).$$

The phase delay $\varphi_m(x, y, \lambda)$ at each point (x, y) of the phase delay profile described above may be achieved by a material according to:

$$\varphi_m(x, y, \lambda) = \frac{n \times 2\pi}{\lambda}L,$$

where n is the refractive index of the material and L is the thickness of the material at the point (x, y). In refractive lens 1100, the refractive index may be homogeneous, and the phase delay $\varphi_m(x, y, \lambda)$ at each point (x, y) may be achieved by a respective thickness L. In contrast, in flat lens 1102, the thickness L may be uniform and the phase delay $\varphi_m(x, y, \lambda)$ at each point (x, y) may be achieved by a respective effective refractive index n.

As shown in FIG. 11, in order to achieve the phase delay profile described above through propagation phase, a lens may be discretized into a finite number of segments 1110 according to a certain lattice or grid in the x-y plane. In each segment 1110, a meta-element 1122 including a high-refractive index material and having a designed geometry may be placed in the segment, to provide a desired effective index n and thus a desired phase delay that may be achieved by a corresponding element 1120 of refractive lens 1100 at the segment. Meta-elements 1122 may be formed on a substrate 1105, which may include a transparent material, such as glass, quartz, plastic, crystal, ceramic, and the like. Meta-elements 1122 may include, for example, a high-refractive index dielectric material (e.g., $TiO_2$, $ZrO_2$, $HfO_2$, $Ta_2O_5$, $WO_3$, $Nb_2O_5$, $Si_3N_4$, TiN, ZrN, or HfN), a semiconductor material (e.g., GaN or Si), a metal, and the like. The high-refractive index material may enable small pitch size and low thickness, while achieving a phase delay coverage.

Flat lens 1102 may include meta-elements that are designed to modify the phase of the incident light differently at different segments such that collimated incident light may be focused onto a same spot (e.g., a focal point) by flat lens 1102. Meta-elements 1122 may have regular, irregular, or arbitrary shapes. For example, each meta-element 1122 may be characterized by a cross-sectional shape of a rectangle, a square, a polygon, a circle, an oval, a ring, a polygon with an aperture, or an irregular shape. The size of each meta-element 1122 may be designed to have a desired fill factor F in each segment in order to achieve a desired phase delay. The fill factor F represents the percentage of the period (e.g., length in a 1-D segment and area in a 2-D segment) that is filled with the high-refractive index material. Even though not shown in FIG. 11, regions between meta-elements 1122 may be filled with a low-refractive index material, such as $SiO_2$.

There may be several factors that can affect the performance of an optical metasurface, such as the size of each segment and the shape of each segment. The shape of each segment may affect the effective refractive indices for light of different polarization states. Examples of space discretization or segmentation of a flat optical device may include square discretization and hexagon space discretization.

Other discretization schemes may also be used to divide a flat optical device into uniform or nonuniform segments.

Metasurfaces can be designed to have the same or very similar angular deflection for red, green, and blue wavelength bands, and therefore may not need accurate alignment with the light emitting panel. Metasurfaces may be manufactured using standard nanofabrication processes that are compatible with CMOS/NMOS/PMOS/TFT or other display-related fabrication processes. Metasurfaces can have sub-micron thicknesses and thus may allow for a large range of incidence angles (without any potential clipping or edge effect).

Figures 12A, 12B, 12C:
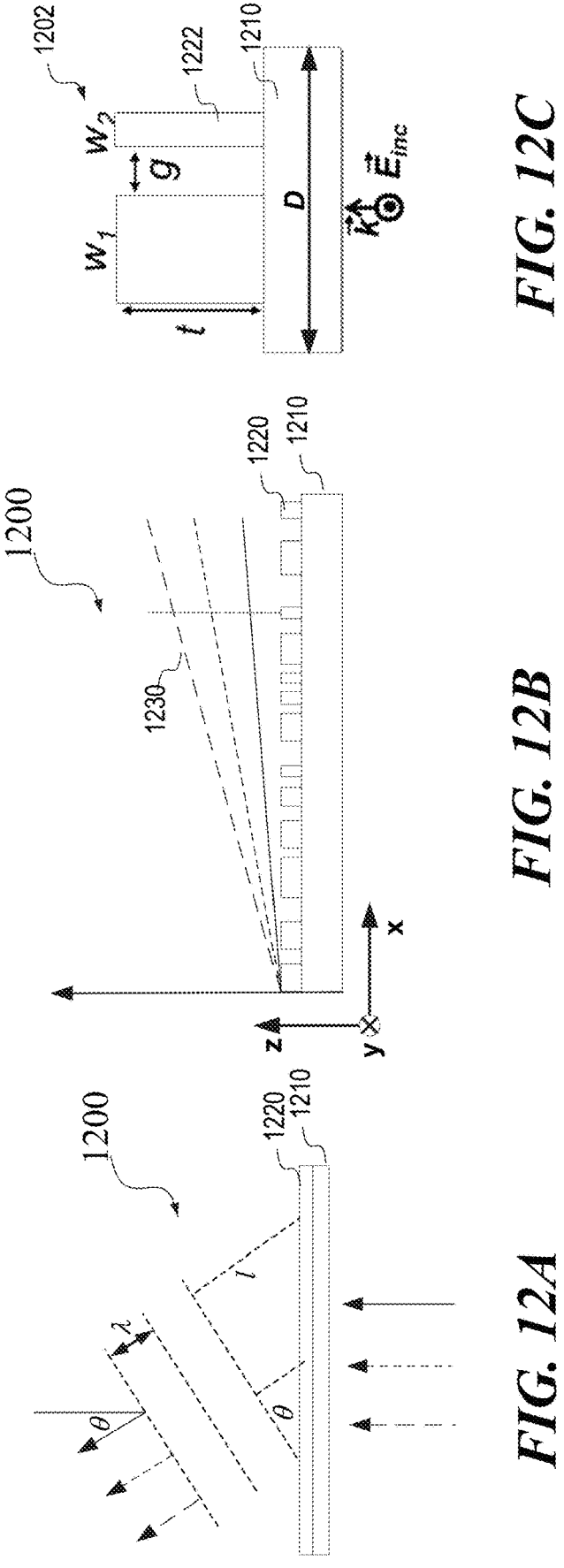
FIG. 12A illustrates an example of an achromatic metasurface for light deflection.
FIG. 12B illustrates phase shifts of the achromatic metasurface for light of different wavelengths in order to achieve the desired wavefronts shown in FIG. 12A.
FIG. 12C illustrates an example of a nanostructure of nanostructures in the achromatic metasurface of FIG. 12B.

FIG. 12A illustrates an example of an achromatic metasurface 1200 for light deflection. Achromatic metasurface 1200 may include a substrate 1210 (including, e.g., glass, quartz, plastic, crystal, ceramic, or the like) and nanostructures 1220 (e.g., dielectric, semiconductor, or metal nanostructures) formed on substrate 1210. FIG. 12A shows that the desired wavefronts for light of multiple colors may all be plane waves tilted at an angle θ with respect to achromatic metasurface 1200, such that the propagation directions of the incident light of different color are all deflected by achromatic metasurface 1200 by an angle θ.

FIG. 12B illustrates phase shifts of achromatic metasurface 1200 for light of different wavelengths in order to achieve the desired wavefronts shown in FIG. 12A. As described above, the total phase delay $\varphi_{tot}$ of each wavelet at a point (or plane) of interest may be the sum of a phase shift $\varphi_m(x, \lambda)$ introduced by achromatic metasurface 1200 at a corresponding point x of achromatic metasurface 1200 and a phase $\varphi_p(x, \lambda)$ accumulated during propagation from point x of achromatic metasurface 1200 to the point (or plane) of interest. The phase accumulated during propagation may be $\varphi_p(x, \lambda)=2\pi \times l/\lambda$, where l is the optical path length (e.g., distance in free space) from point x of achromatic metasurface 1200 to the point (or plane) of interest. Thus, the phase shift $\varphi_m(x, \lambda)$ introduced by achromatic metasurface 1200 at the corresponding point x of the metasurface may need to be $\varphi_m(x, \lambda)=-2\pi \times l/\lambda$ in order to compensate for the wavelength-dependent phase accumulated during propagation. The phase shifts at different points x of achromatic metasurface 1200 for light of each different wavelength are shown by a respective line 1230 in FIG. 12B, which shows that at a given point x on achromatic metasurface 1200, the phase shift imparted at point x on achromatic metasurface 1200 may need to be different for different wavelengths. For example, for red light, because the wavelength λ of the light is longer, phase $\varphi_p(x, \lambda)$ accumulated during propagation may be smaller, and thus phase shift $\varphi_m(x, \lambda)$ introduced by achromatic metasurface 1200 may need to be smaller.

FIG. 12C illustrates an example of a nanostructure 1202 of nanostructures 1220 in achromatic metasurface 1200. In the illustrated example, nanostructure 1202 may have a width D, and may include two coupled rectangular resonators 1222 of a same height t and varying widths $w_1$ and $w_2$. The gap g between the two coupled rectangular resonators may also be varied to tune the resonant conditions and the phase shifts for light of different colors at any given point on achromatic metasurface 1200.

Figure 13:
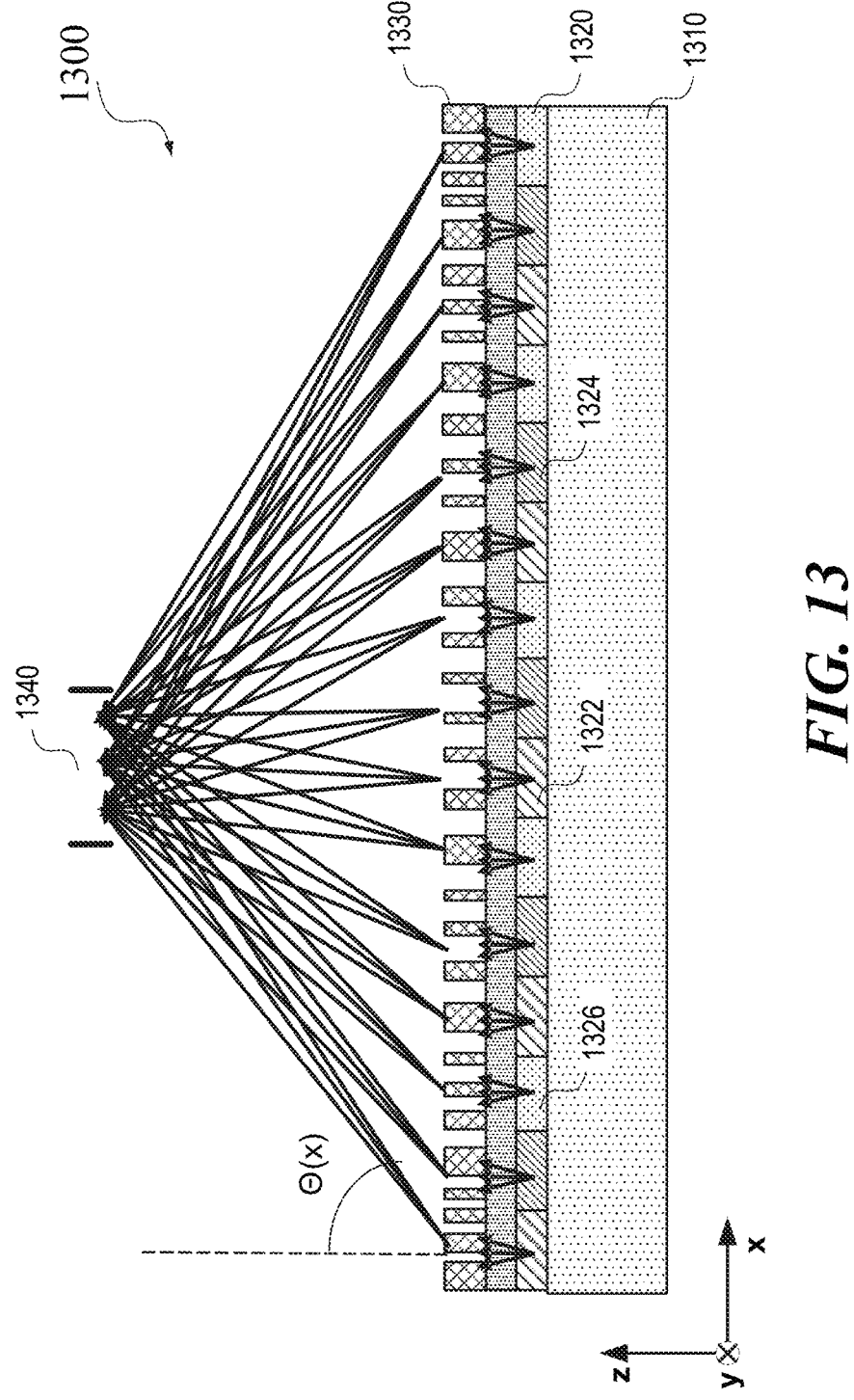
FIG. 13 illustrates an example of a micro-display panel including an array of light sources and a metasurface for achromatic and variable light deflection according to certain embodiments.

FIG. 13 illustrates an example of a micro-display panel 1300 including a substrate 1310, an array of light sources 1320, and a metasurface 1330 for achromatic and variable light deflection according to certain embodiments. Light sources 1320 may include micro-LEDs, OLEDs, QDLEDs, QDEL devices, PeLEDs, liquid crystal display panel with color filters, and the like. For example, light sources 1320 may include an array of red LEDs 1322, an array of green LEDs 1324, and an array of blue LEDs 1326 fabricated or bonded to substrate 1310. A red LED 1322, a green LED 1324, and a blue LED 1326 in adjacent areas may form a display pixel. The pitch of the array of light sources 1320 may be, for example, less than about 20 μm, less than about 10 μm, less than about 5 μm, less than about 2 μm, or smaller. Metasurface 1330 may have different deflection angles at different regions, and may deflect light of different wavelengths emitted in a same region to a same direction or similar directions (e.g., with differences less than about 5%, 2%, or 1%) towards an input aperture 1340. For example, light beams emitted from the red LED 1322, green LED 1324, and blue LED 1326 of a display pixel may be deflected by a region of metasurface 1330 by a same deflection angle θ(x) or similar angles, where deflection angle θ(x) may vary as the position x of the pixel varies.

In some embodiments, the array of light sources 1320 may be characterized by a minimum pitch less than about 100 μm, less than about 20 μm, less than about 10 μm, or less than about 5 μm. In some embodiments, the array of light sources 1320 may have a variable pitch that may be small at the center of the array of light sources 1320 and may be larger at the peripherals of the array of light sources 1320.

Figures 14A, 14B:
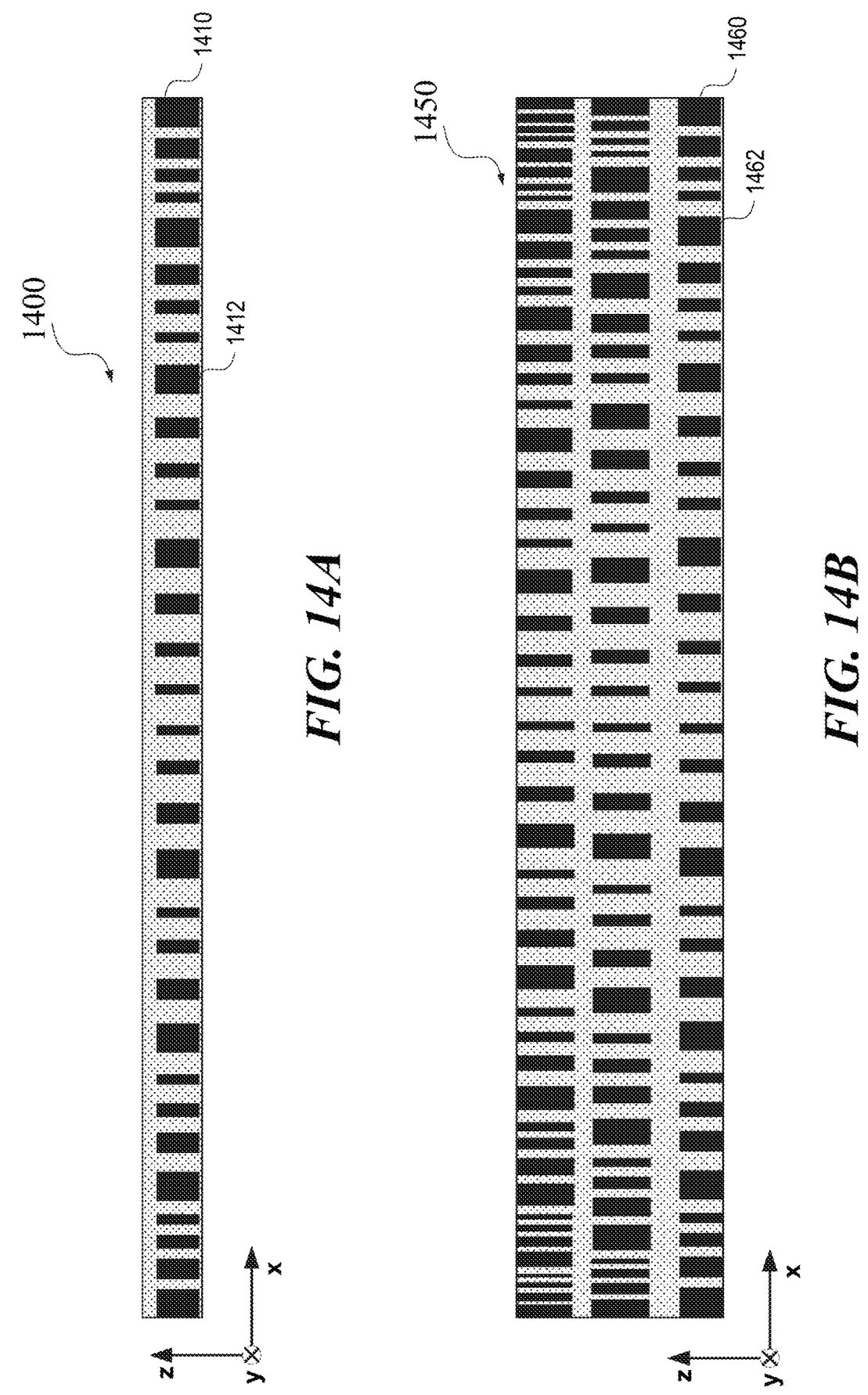
FIG. 14A illustrates an example a single-layer metasurface according to certain embodiments.
FIG. 14B illustrates an example a multi-layer metasurface according to certain embodiments.
Figures 15A, 15B, 15C, 15D, 15E, 15F, 15G:
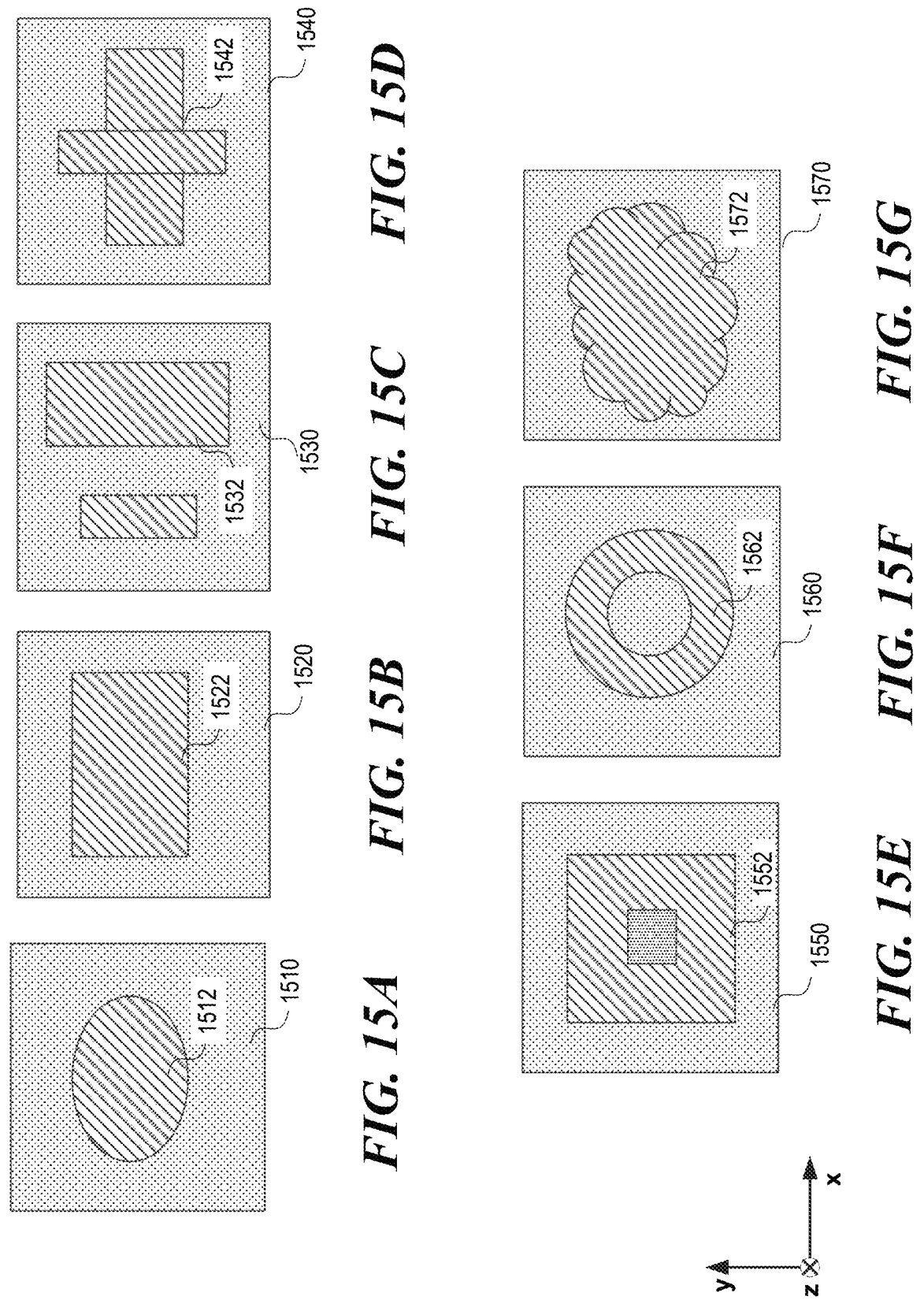
FIGS. 15A-15G illustrate top views of examples of nanostructures that may be used as the meta-elements according to certain embodiments.

FIG. 14A illustrates an example of a single-layer metasurface 1400 according to certain embodiments. Metasurface 1400 may include an array of sub-wavelength structures 1412 (referred to as meta-atoms or meta-elements), and a low-index material 1410 in regions between sub-wavelength structures 1412. Each sub-wavelength structure 1412 may have a feature size smaller than the wavelength of the light to be deflected. The geometry of individual meta-atoms and the arrangement of the meta-atoms may be selected to deflect incident light of multiple color bands each with a certain bandwidth towards a same direction, or towards similar directions with the difference much smaller than the angular profile of the incident light.

In order to increase the efficiency of an optical metasurface, the effect of the phase delay discretization caused by the space discretization may need to be minimized. Ideally, the size of each segment may need to be as small as possible to reduce the influence of space discretization, such that the phase delay profile of the optical metasurface may be as close to the ideal phase delay profile without discretization as possible. When the pitch of the segments is small, each segment may be close to a point, and the fill factors of the segments may need to be gradually changed to gradually change the effective refractive index as the point, thereby achieving a substantially smooth phase profile of a lens as described above. In general, the smaller the pitch (or period) of the segments, the better the performance of the optical metasurface. However, the pitch of the segments and the feature size of a meta-element in a metasurface may be limited by existing nanofabrication techniques. For example, the feature size of a meta-lens for visible light may range from about 20 to about 40 nm, which may be difficult to achieve. In addition, when the refractive index of the material of the meta-elements is not sufficiently high (e.g., greater than about 2.5, 2.7, 3, or higher), the meta-elements may need to have a higher height or thickness to achieve the desired effective refractive index, which may result in high-aspect-ratio meta-elements and may increase the fabrication difficulty.

FIG. 14B illustrates an example a multi-layer metasurface 1450 according to certain embodiments. In some embodiments, single layer metasurfaces as shown in FIG. 14A may be able to achieve the desired achromatic performance and desired efficiency, but may have low optical efficiencies due to, for example, low fill factors in the metasurfaces. To increase the efficiency, it may be desirable to reduce the interspace between the nanostructures (e.g., resonators) and increase the packing density of the nanostructures. However, at higher packing densities and with smaller interspaces, the near field of adjacent nanostructures may start to couple and modify the amplitude and/or phase responses of individual nanostructures to deviate from the designed values. Multi-layer metasurface 1450 including multiple metasurfaces 1460 arranged in a stack may achieve the desired functions and packing density (and efficiency). Each metasurface 1460 in the stack may include meta-elements 1462 and a low-refractive index material between meta-elements 1462, to generate a portion of the total phase delay at a given area of multi-layer metasurface 1450, thereby approximate the ideal phase delay profile of an optical device, such as a lens.

The multiple metasurfaces 1460 may be fabricated layer by layer on a substrate through multiple cycles of processing such as deposition, planarization, and etching. For example, in each cycle, a high-refractive index material layer may be deposited, planarized, and etched to form meta-elements 1462 in the high-refractive index material layer, a low-refractive index material layer may be deposited on the high-refractive index material layer to fill gaps between meta-elements 1462, and the deposited low-refractive index material layer may be planarized to form a flat top surface for fabricating another metasurface 1460.

Even though FIGS. 11, 12B, 13, 14A, and 14B show metasurfaces with one or more flat layers, metasurfaces may have variable heights in some other embodiments. For example, a metasurface may include one or more layers with variable thicknesses, and may be fabricated using, for example, direct laser writing, gray-scale lithography, and the like.

FIGS. 15A-15G illustrate top views (or horizontal cross-sectional views) of examples of nanostructures that may be used as the meta-elements according to certain embodiments. As illustrated, the building blocks of the metasurface can include 3D or quasi-3D structures 1512, 1522, 1532, 1542, 1552, 1562, or 1572, such as nanopillars, nanorods, etched holes of various sizes and (regular or irregular) shapes, or any combination thereof. Regions between the meta-elements may be filled with a low-refractive index material 1510, 1520, 1530, 1540, 1550, 1560, or 1570. The cross-sectional shapes, sizes, and materials of the nanostructures and the low-refractive index material can be engineered to achieve the desired dispersive response of the beam deflector.

Figure 16B:
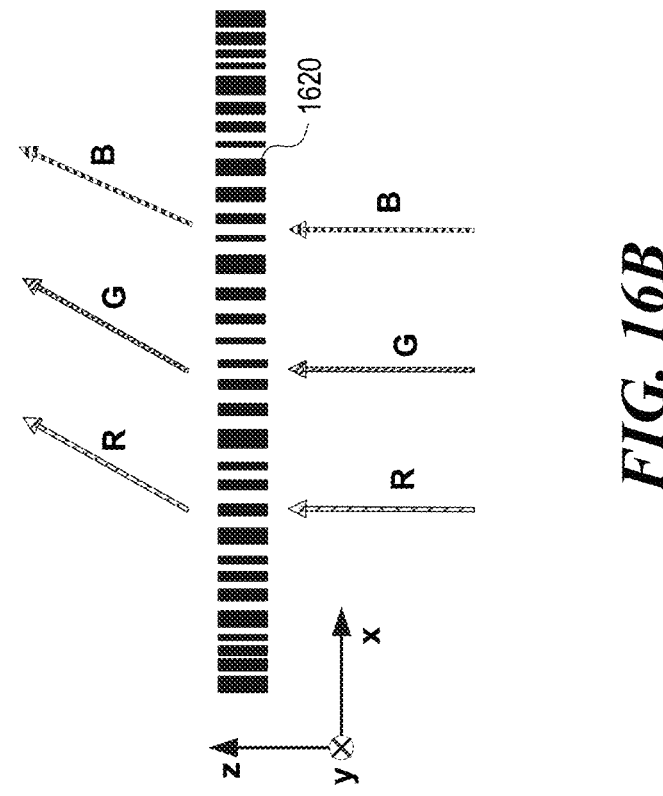
FIG. 16B illustrates an example of a metasurface for light deflection according to certain embodiments.
Figure 16A:
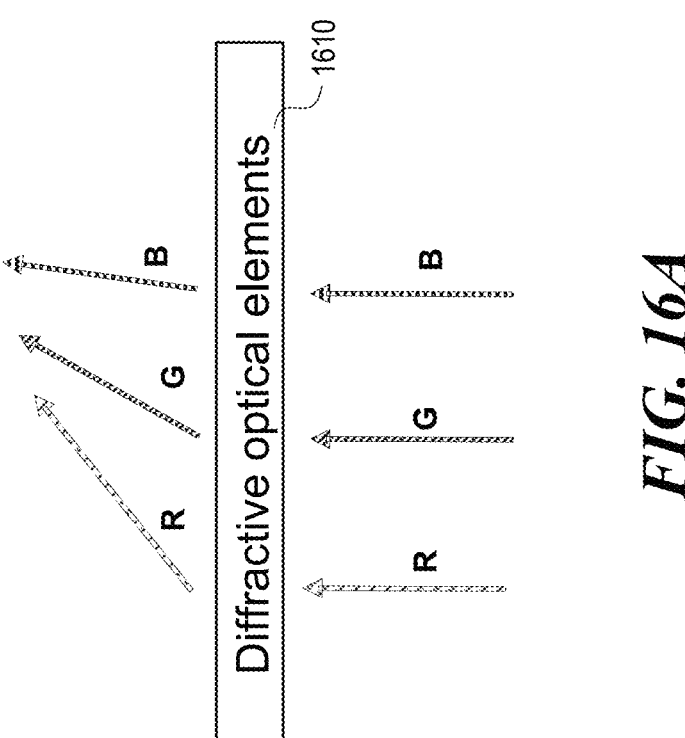
FIG. 16A illustrates an example of diffractive optical elements for light deflection.

FIG. 16A illustrates an example of a diffractive optical element 1610 (e.g., a grating) for light deflection. In gratings with frequency-insensitive phase (φ), for surface-normal incident light, the diffraction angle for non-zero diffraction orders may be larger for red light than for blue light in order to satisfy the grating equation, such as d×sin θ=m×λ for binary gratings, where d is the grating period, θ is the diffraction angle, m is the diffraction order, and λ is the wavelength. Therefore, surface-normal incident light of different colors may be diffracted by a grating at different angles, which may be useful for some applications but may cause chromatic aberrations that may reduce the image quality. As illustrated, diffractive optical elements may suffer from severe chromatic dispersion. As a result, red, green, and blue light may be deflected/diffracted to different angles, resulting in color shift across the eyebox.

FIG. 16B illustrates an example of a metasurface 1620 for light deflection according to certain embodiments. Metasurface 1620 may be an example of metasurface 1200, 1330, or

1410. Metasurface 1620 can be designed to operate achromatically so as to deflect R/G/B light to the same (or similar) angle. For example, the spatial phase profile (φ) of the metasurface may be designed to be a function of frequency (ω).

Figure 17:
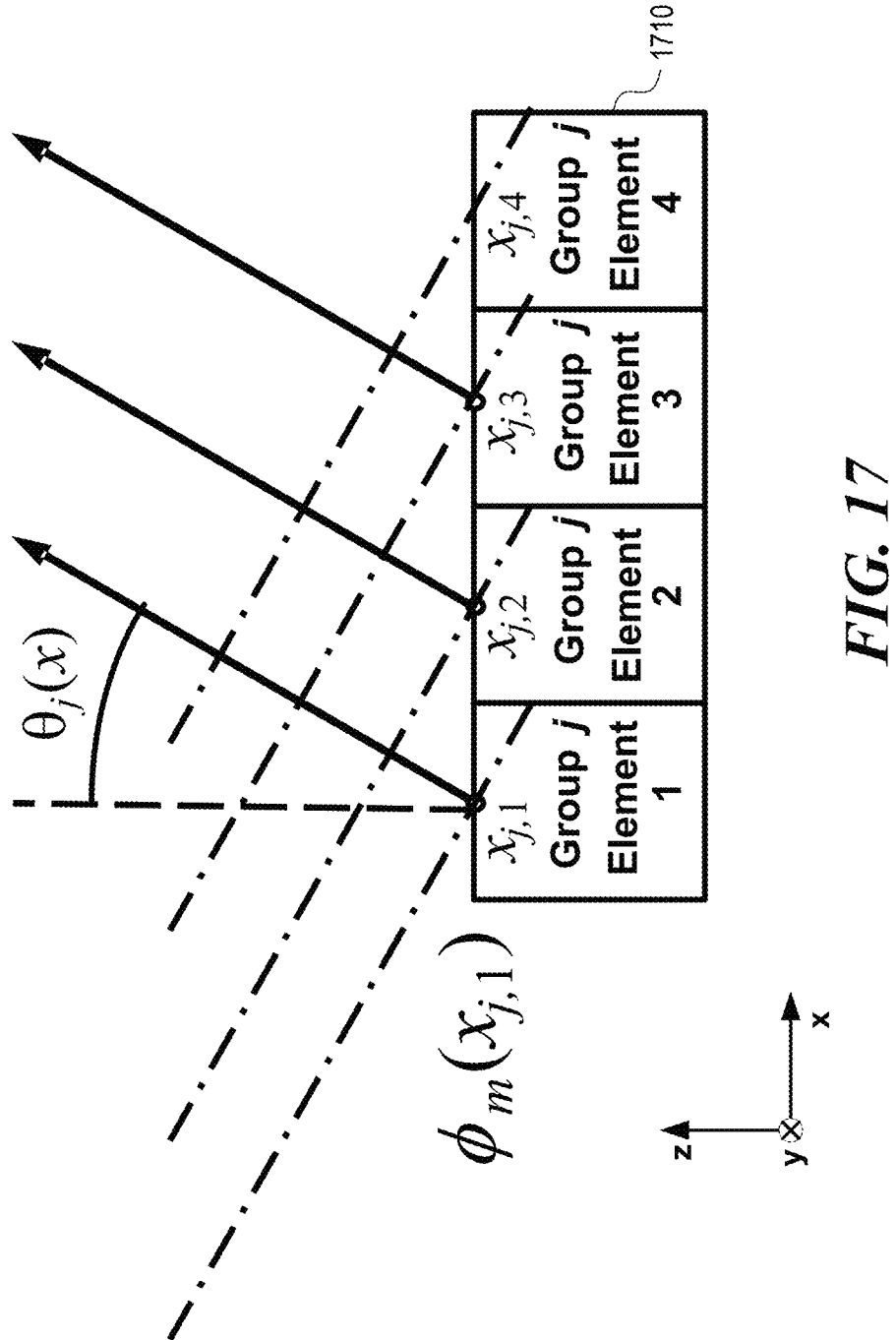
FIG. 17 illustrates examples of phase profiles of elements in a group of elements of a metasurface achromatic light deflector according to certain embodiments.

FIG. 17 illustrates examples of phase profiles $\phi_m(x_{j,k})$ of elements k in a group j of elements of a metasurface achromatic light deflector 1710 for mth diffraction order according to certain embodiments. The target phase profile of each element of the group of elements may be:

$$\phi(x, \omega) = \frac{\omega x \sin\theta}{c} + \phi_0(\omega), \text{ or}$$

$$\phi(x, \omega) \cong \phi(x, \omega_c) + \frac{\partial\phi(x, \omega)}{\partial\omega}\bigg|_{\omega=\omega_c} (\omega - \omega_c),$$

where x is the spatial coordinate across a metasurface, θ(x) is the beam deflection angle and may be a slowly varying function of x, c is the speed of light in free space, ω is the frequency of light, $\omega_c$ is the center frequency of each color band, φ is the phase profile of light out from the metasurface, and $\phi_0$ is a reference phase. $\phi_0$ may be frequency-dependent but may not vary spatially. In some embodiments, $\phi_0$ may be used as a design knob. In the above equation, the first term $$\phi(x, \omega_c) = \frac{\omega_c x \sin\theta}{c} + \phi_0(\omega_c)$$

is the phase at the center wavelength to achieve achromatic performance for the center wavelengths of multiple wavelength bands (e.g., red, green, and blue). The second term $$\frac{\partial\phi(x, \omega)}{\partial\omega} = \frac{x\sin\theta}{c} + \frac{\partial\phi_0(\omega)}{\partial\omega}$$

is the spectral dispersion (or group delay) to achieve achromatic performance over each wavelength band. In one illustrative example, to achieve achromatic performance over a 10-nm bandwidth at a central wavelength about 500 nm, if the deflection angle is 30° and the size of the metasurface section is about 5 μm (about 10λ), the largest phase change over 10 nm may be about π/10. If the size of the section is about 50 μm, the biggest phase change over 10 nm bandwidth may be about π.

Metasurface-based achromatic light deflectors for near-eye display disclosed herein may be designed using various techniques. Some examples of these techniques for design the metasurface to achieve achromatic light deflection may include multi-order grating design, group delay engineering, resonance tuning, inverse photonic design, and the like.

Figure 18:
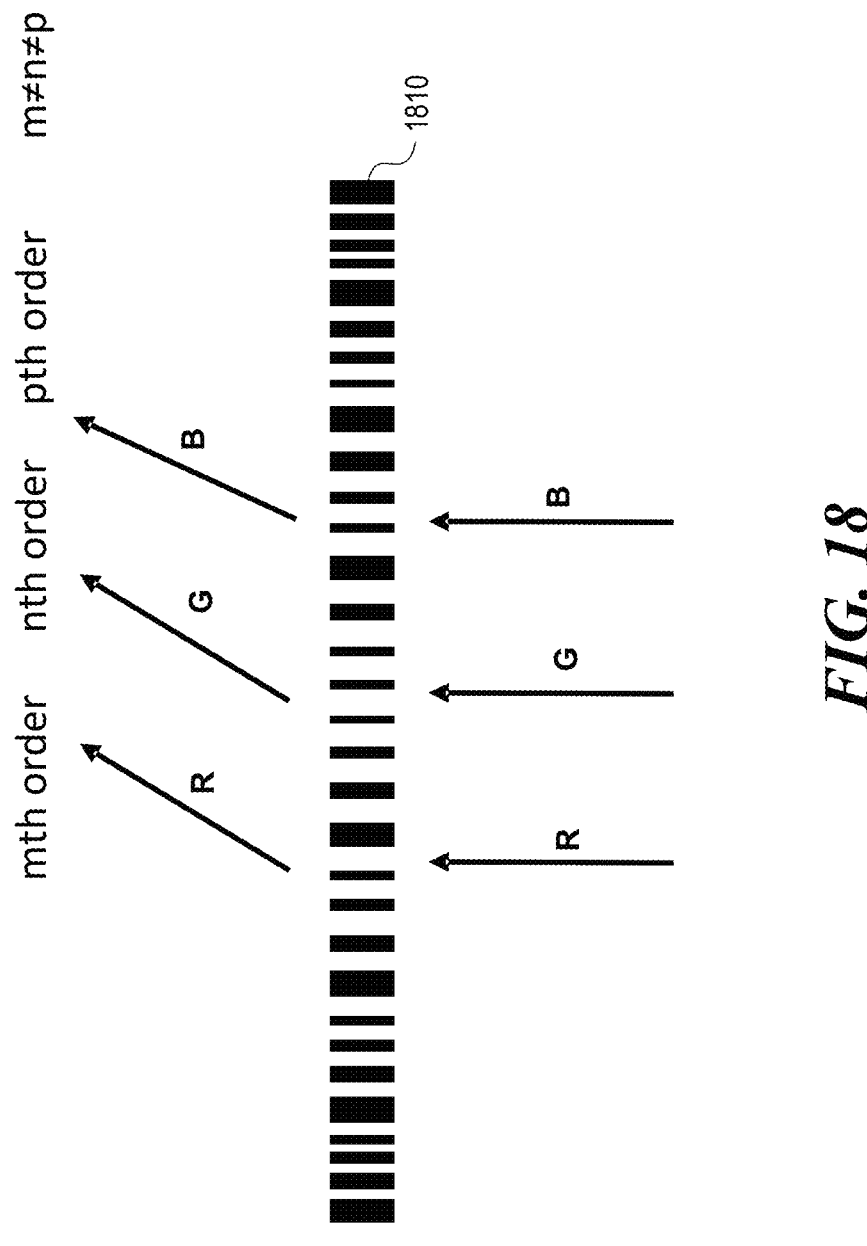
FIG. 18 illustrates an example of a technique to achieve achromatic light deflection using a multi-order grating according to certain embodiments.

FIG. 18 illustrates an example of a technique to achieve achromatic light deflection using a multi-order grating according to certain embodiments. As illustrated in the example, a metasurface-based achromatic light deflector 1810 may be designed to function as multi-order grating, where red, green, and blue light may be diffracted by a substantially same diffraction angle that corresponds to different grating orders for red, green, and blue light. For example, red light may be mainly be diffracted to the mth diffraction order, green light may be mainly be diffracted to the nth diffraction order, and blue light may be mainly be diffracted to the pth diffraction order, where m≠n≠p (e.g., m<n<p).

Figure 19:
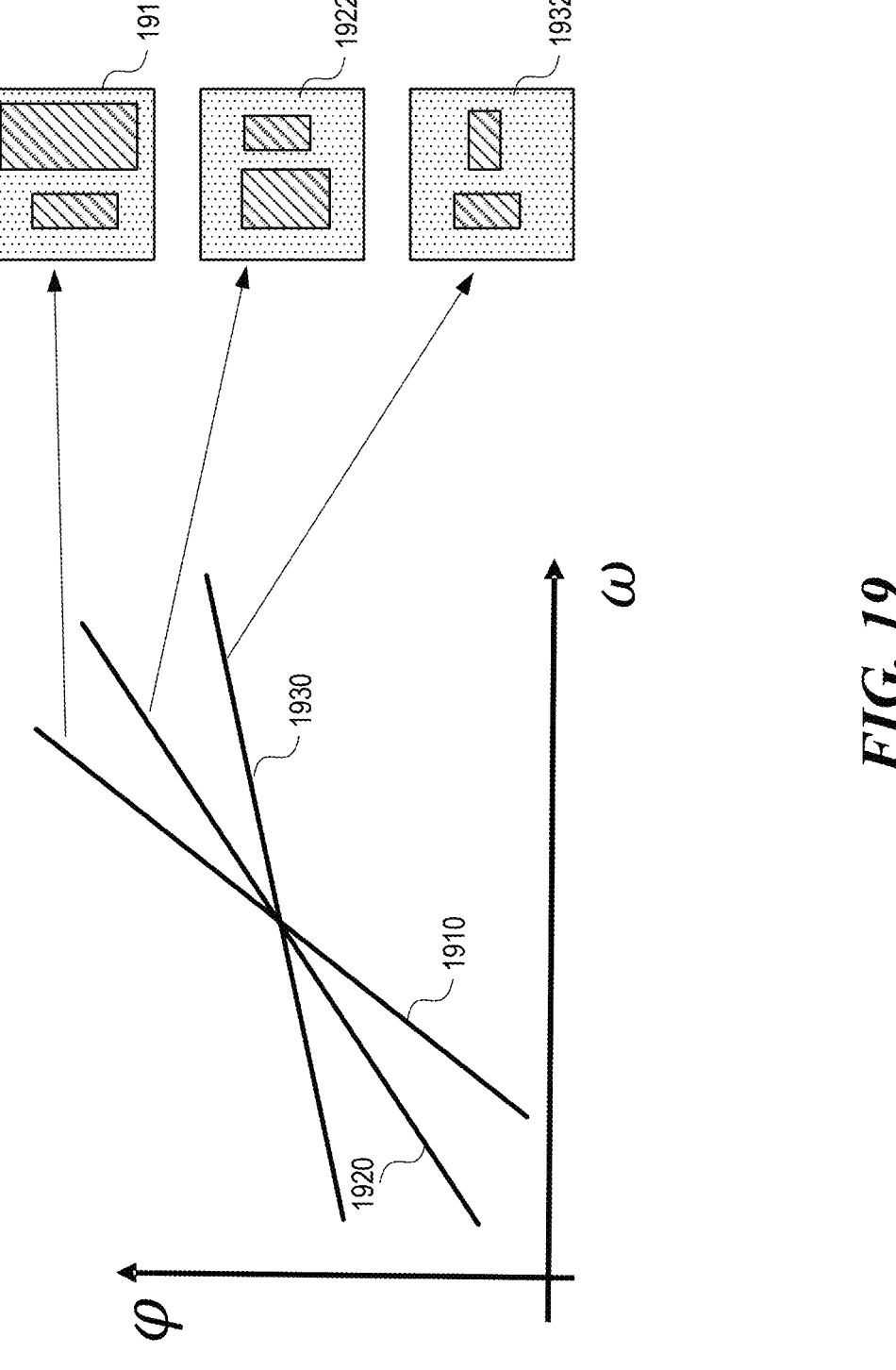
FIG. 19 illustrates an example of a technique to achieve achromatic light deflection using group delay engineering according to certain embodiments.

FIG. 19 illustrates an example of a technique to achieve achromatic light deflection using group delay engineering according to certain embodiments. The nanostructures can be designed using the equations described above with respect to, for example, FIG. 17, to achieve the desired phases for the center wavelengths of different wavelength bands, and the desired different group delay ∂φ/∂ω (the time it takes to transmit through the nanostructures) to compensate for the intrinsic dispersion due to diffraction. For example, meta-elements 1912 may be used to achieve a group delay as indicated by the slope of a line 1910, meta-elements 1922 may be used to achieve a group delay as indicated by the slope of a line 1920, and meta-elements 1932 may be used to achieve a group delay as indicated by the slope of a line 1930.

In some embodiments, nanostructures that support resonant modes may be used to achieve achromatic beam deflection for red, green, and blue light. Nanostructures that support resonant modes can exhibit large and also anomalous dispersion. By engineering the resonant modes, achromatic beam deflection for red, green, and blue light may be achieved.

Figures 20A, 20B:
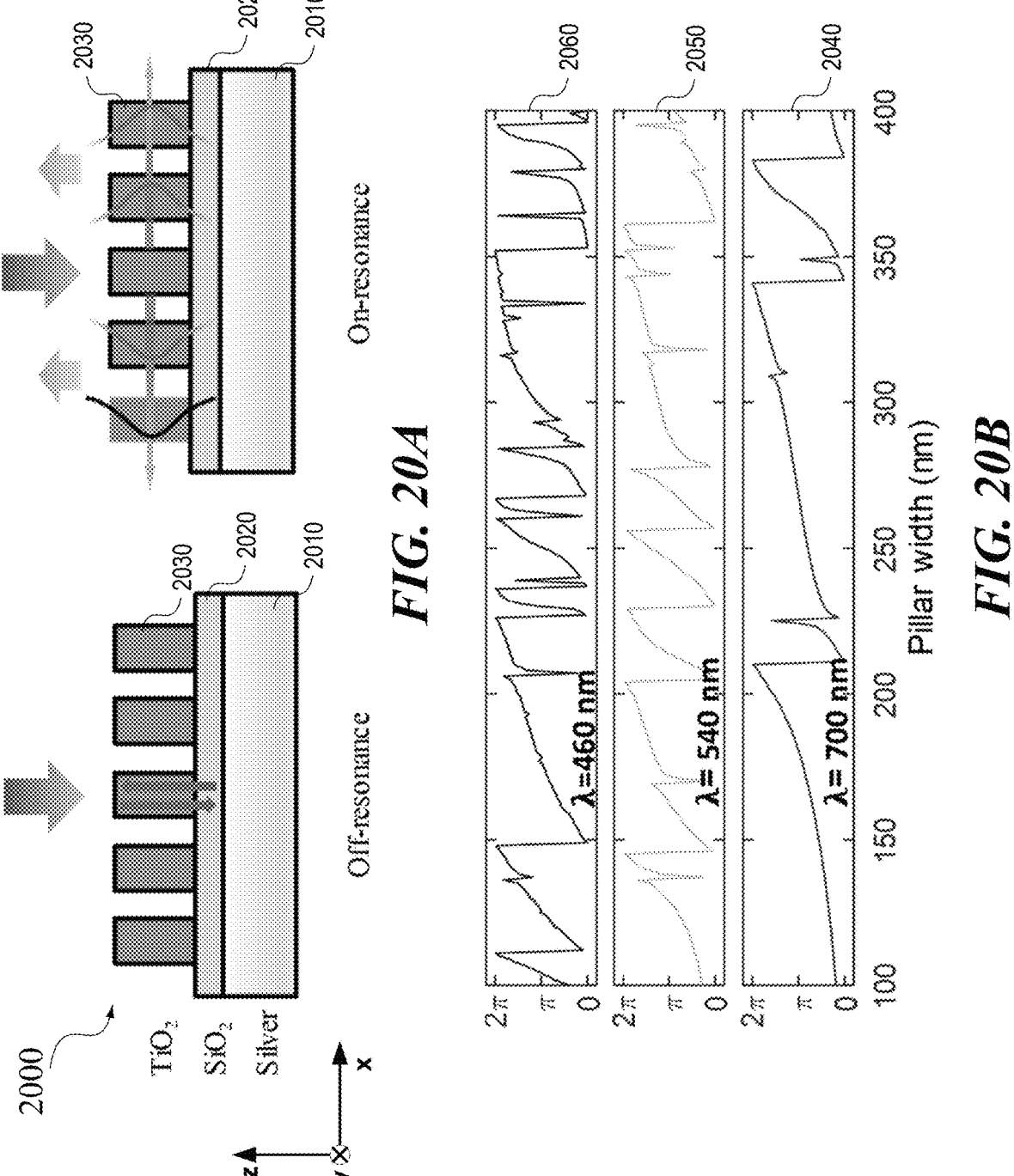
FIG. 20A illustrates an example of a resonant nanostructure according to certain embodiments.
FIG. 20B illustrates examples of the phase profiles of nanopillar structures having a same height but different nanopillar widths for different wavelengths.

FIG. 20A illustrates an example of a resonant nanostructure 2000 according to certain embodiments. In the illustrated example, resonant nanostructure 2000 may include $TiO_2$ nanopillars 2030 and a metallic mirror 2010 (e.g., including a reflective metal such as aluminum or silver), with a $SiO_2$ layer 2020 in between. In the "OFF" mode, incident light may propagate along −z direction in $TiO_2$ nanopillars 2030, and may be reflected by metallic mirror 2010. Light may bounce several time before it is coupled out of the resonant nanostructure that may act as a Fabry-Perot cavity. In the "ON" mode, the resonant nanostructure may couple normally incident light into a waveguide as guided modes that propagate horizontally (e.g., in the x-y plane). The $TiO_2$ nanopillars may serve as the core of the waveguide between air and the $SiO_2$ layer. To couple incident light as the guided modes, phase matching condition may be met by adjusting, for example, the center-to-center distances of adjacent nanopillars, width of the nanopillars, and heights of the nanopillars. The phase of a guided mode may be:

$$\phi = \frac{2\pi}{\lambda} n_{eff} H + \text{resonant phases,}$$

where H is the height of the nanopillars. The guided mode resonances may decouple the phases at different wavelengths. To realize a wavelength-dependent target phase profile, resonant nanostructure 2000 at each position may need to simultaneously fulfill the target phases for all design wavelengths.

FIG. 20B illustrates examples of the phase profiles of nanopillar structures having a same height but different nanopillar widths for different wavelengths (e.g., blue, green, and red). In the illustrated example, each $TiO_2$ nanopillar has a square shape. The phases may be folded into the range of 0-2π. A curve 2040 shows the phase profiles of nanopillar structures having different nanopillar widths for red light, a curve 2050 shows the phase profiles of nanopillar structures having different nanopillar widths for green light, and a curve 2060 shows the phase profiles of nanopillar structures having different nanopillar widths for blue light. The sharp phase jumps in curves 2040, 2050, and 2060 correspond to the excitation of guided mode resonance. Desired phase delays for the different wavelengths may be achieved by, for example, selecting an appropriate nanopillar width based on curves 2040, 2050, and 2060 shown in FIG. 20B.

In some embodiments, metasurfaces may be designed using deep learning techniques. For example, inverse photonic design techniques may be used to optimize nanostructures with the desired dispersive responses for metasurface-based achromatic light deflection. In the deep learning based optimization techniques, the nanostructures are not limited to simple geometrical shapes such as rectangles and circles. Rather, the cross-section of the nanostructure can have a freeform shape.

Figure 21:
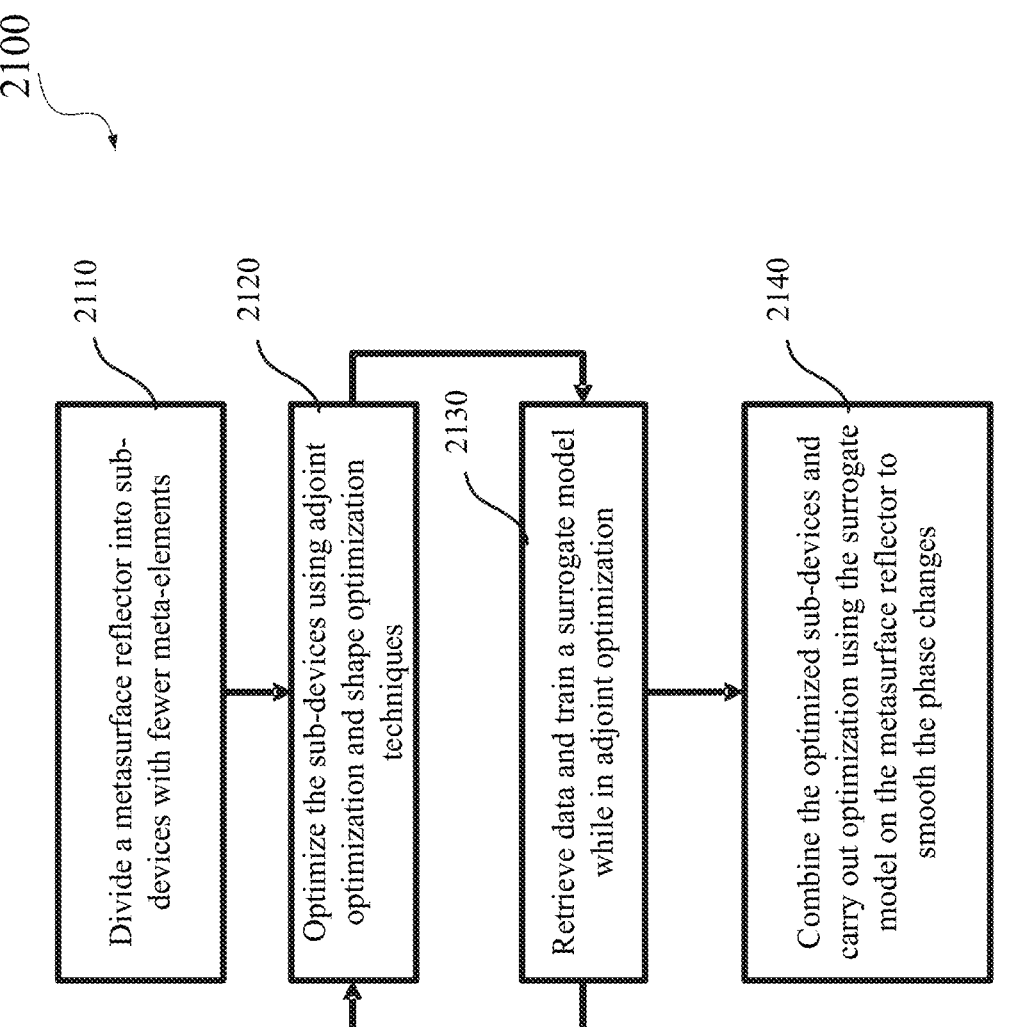
FIG. 21 includes a flowchart illustrating an example a process for metasurface-based achromatic light deflector design and optimization.

FIG. 21 include a flowchart 2100 illustrating an example a process for metasurface-based achromatic light deflector design and optimization. In the illustrated example, the inverse photonic design may use the adjoint optimization method and/or other optimization techniques, such as shape optimization, topology optimization, convolutional neural network, stimulated annealing, genetic algorithm, and the like. The adjoint optimization process may include, at block 2110, for a given metasurface-based achromatic light deflector, breaking the whole devices into sub-devices with fewer meta-elements (unit cells); optimizing the sub-devices using adjoint optimization and shape optimization techniques at block 2120; retrieving data and training a surrogate model while in adjoint optimization at block 2130; and combining the optimized sub-devices and carrying out optimization using the surrogate model on the whole metasurface-based achromatic light deflector to smooth any phase changes at block 2140.

Figure 22:
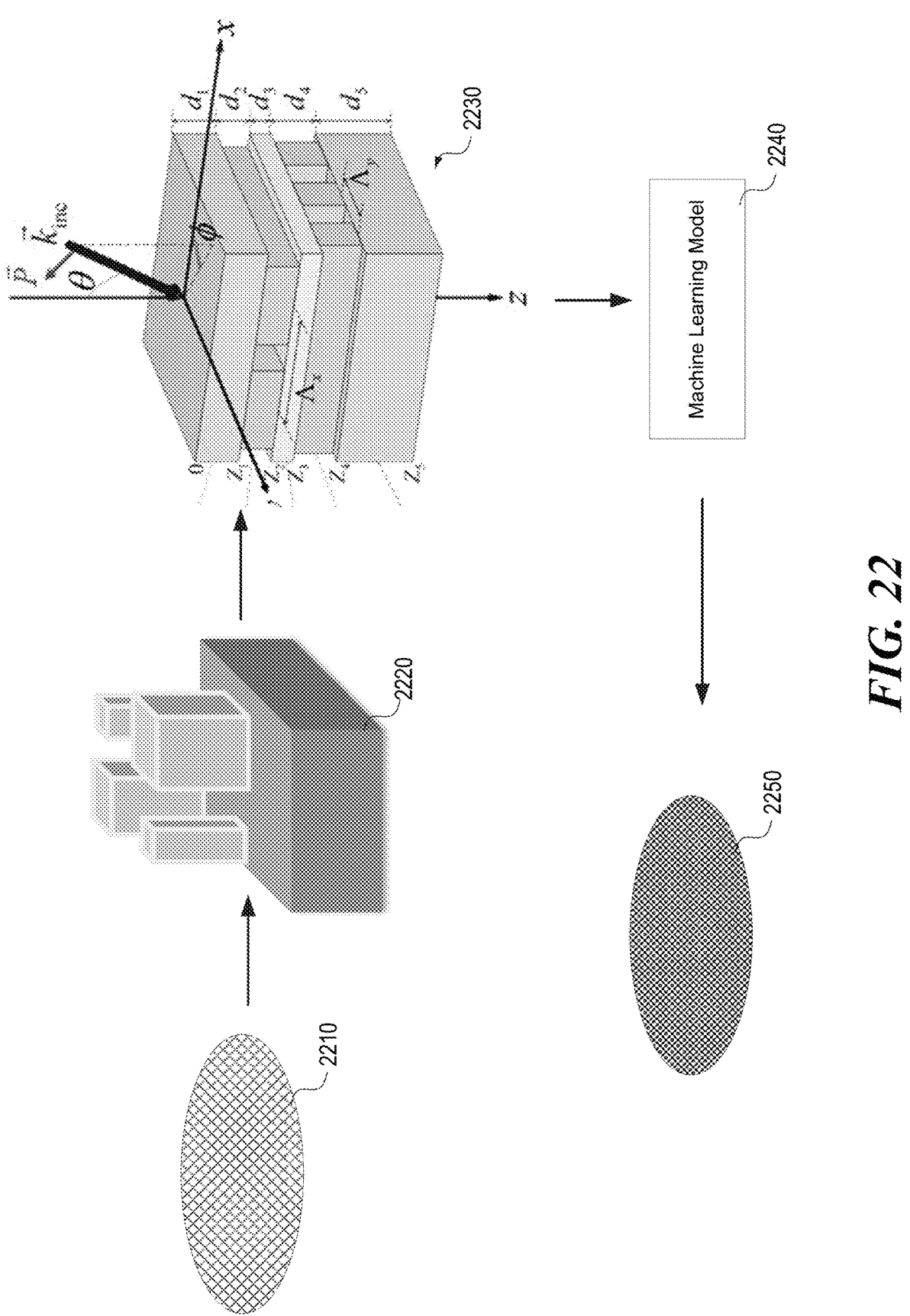
FIG. 22 illustrates an example a process for metasurface-based achromatic light deflector design and optimization described in the flowchart of FIG. 21.

FIG. 22 illustrates an example a process for metasurface-based achromatic light deflector design and optimization described in flowchart 2100 of FIG. 21. In the illustrated example, a metasurface deflector 2210 may be approximated as an assembly of sub-devices that include a plurality of unit-cells 2220. The structures of the sub-devices and/or unit-cells 2220 may be optimized using adjoint optimization and shape optimization techniques as shown by a graph 2230. During the adjoint optimization, data may be collected and used to train a machine learning model 2240 (e.g., a surrogate model) to at least partially replace the complicate and expensive simulation of the sub-devices and/or unit-cells 2220. The machine learning model may enable massive, parallelized simulation, thereby significantly reducing the time for evaluating the fitness/cost function of the sub-devices and/or unit-cells 2220 during the optimization. The optimized subsystems may be combined, and the whole metasurface deflector may be optimized using the surrogate models to smooth any phase changes and achieve a metasurface deflector 2250 with desired performance.

Figure 23:
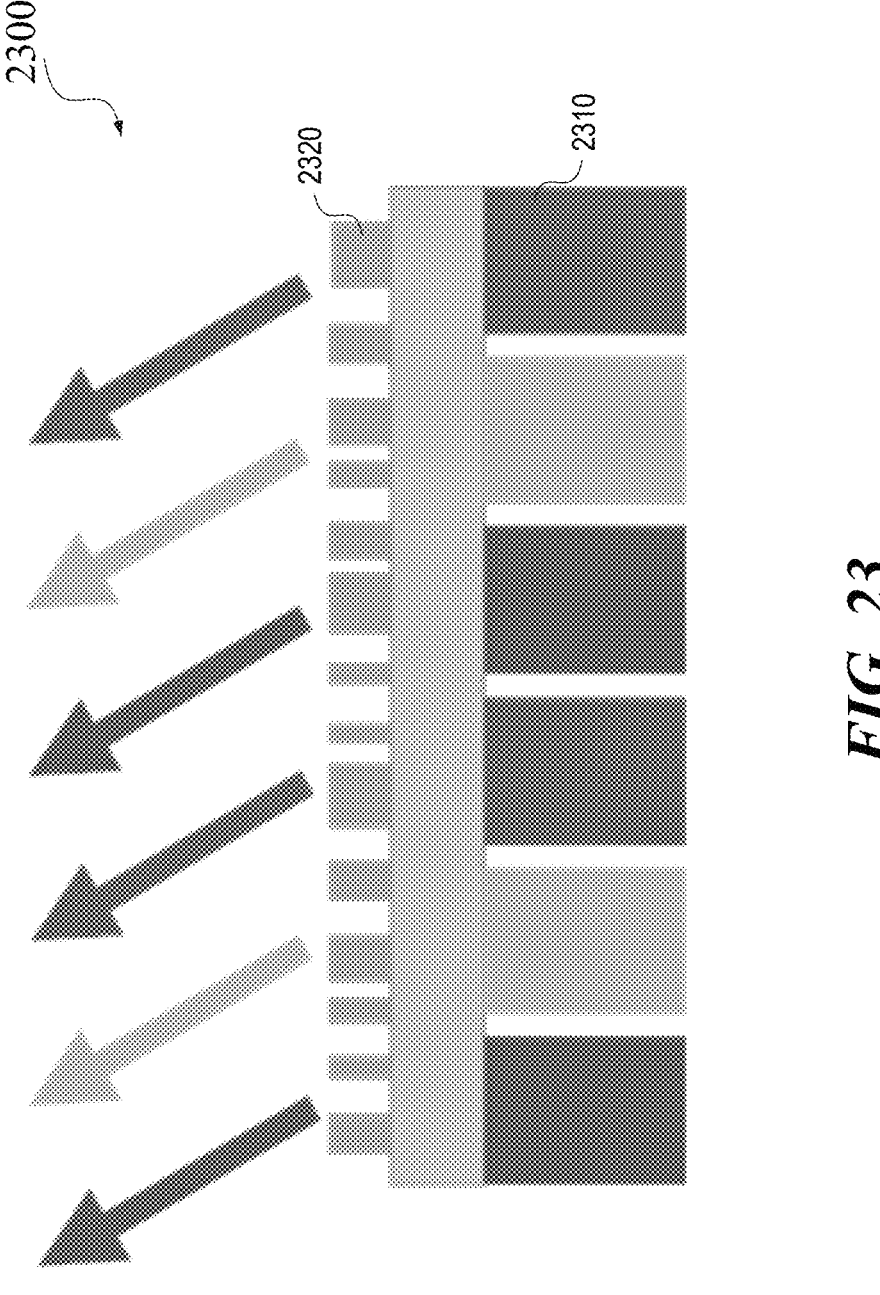
FIG. 23 illustrates an example of a display device including an array of light emitters and an achromatic metasurface deflector.

FIG. 23 illustrates an example of a display device 2300 including an array of light emitters 2310 and an achromatic metasurface deflector 2320. The array of light emitters 2310 may include red, green, and blue light emitters, such as micro-LEDs. In the illustrated example, metasurface deflector 2320 may be divided into a plurality of patches, and may be designed in a patch-by-patch fashion. For example, the achromatic performance may be maintained within each patch, but may not necessarily need to be maintained across different patches. Each patch may be used to deflect light beam(s) from a single or multiple light-emitting elements (display pixels). In some embodiments, the patch size may vary from, for example, about 20 μm to about 500 μm.

As described above, in addition to light deflection, other functionalities can also be integrated into the metasurfaces through designs of individual meta-elements or the arrangement of different meta-elements to achieve the desire phase profile. For example, the metasurface may be designed to both collimate or focus the emitted light (to modify the emission profile of each light source) and deflect the emitted light. The different functions may be achieved using one or more layers of metasurfaces as describe above.

Figure 24B:
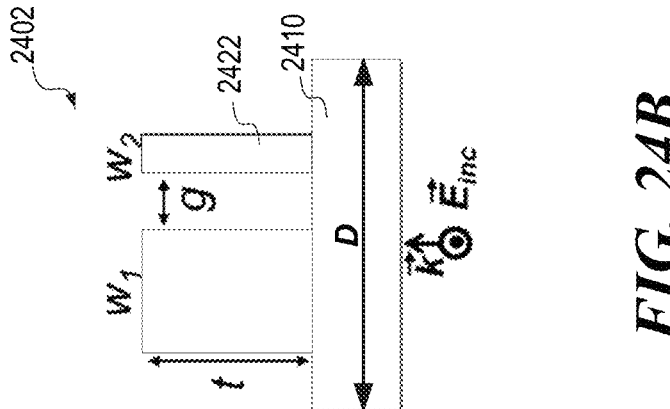
FIG. 24B illustrates an example of a nanostructure of the achromatic flat lens of FIG. 24A.
Figure 24A:
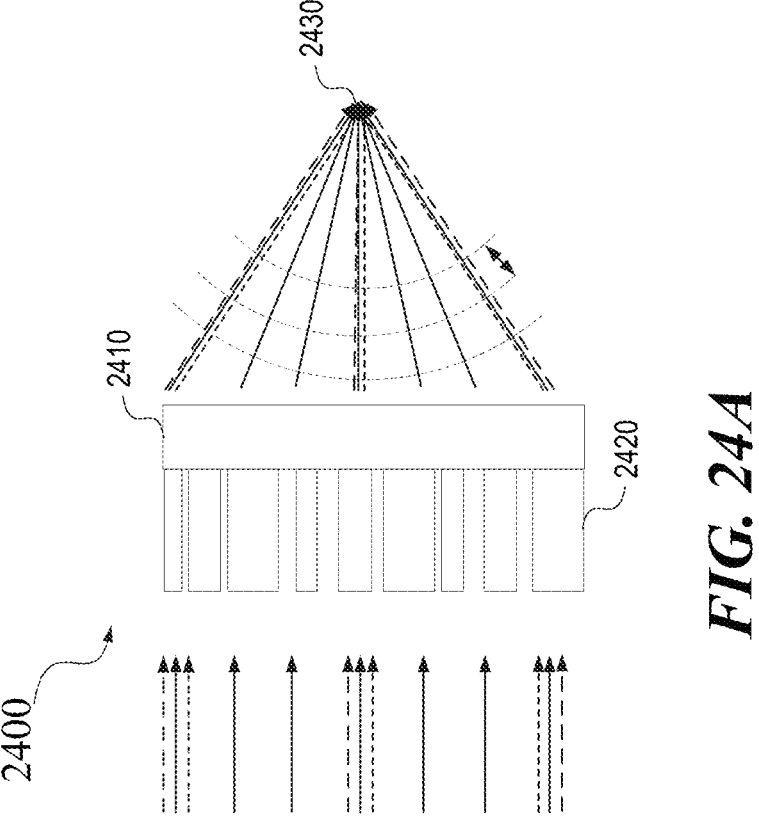
FIG. 24A illustrates an example of an achromatic flat lens including a metasurface according to certain embodiments.

FIG. 24A illustrates an example of an achromatic flat lens 2400 including a metasurface 2420 on a substrate 2410 according to certain embodiments. Substrate 2410 may include a transparent material, such as glass, quartz, plastic, crystal, ceramic, or the like. Metasurface 2420 may include, for example, a high refractive index dielectric material (e.g., $TiO_2$), a semiconductor material, a metal, and the like. Metasurface 2420 may include nanostructures that are designed to modify the phase of the incident light differently at different locations such that collimated incident light having different colors may be focused onto a same spot (e.g., focal point 2430) by achromatic flat lens 2400. As described above, the total phase delay $\varphi_{tot}$ of each wavelet at the focal point may be the sum of the phase shift $\varphi_m(x, \lambda)$ introduced by metasurface 2420 at a corresponding point x of metasurface 2420 and the phase $\varphi_p(x, \lambda)$ accumulated during propagation from the point x of metasurface 2420 to focal point 2430. The target phase shift $\varphi_m(x, \lambda)$ introduced by metasurface 2420 at a point x for each wavelength $\lambda$ may be described by:

$$\varphi_m(x, \lambda) = -\frac{2\pi}{\lambda}\left(\sqrt{x^2 + f^2} - f\right).$$

FIG. 24B illustrates an example of a nanostructure 2402 (meta-element) of metasurface 2420 in achromatic flat lens 2400. In the illustrated example, nanostructure 2402 may have a width D, and may include two coupled rectangular resonators 2422 of a same height t and varying widths $w_1$ and $w_2$. The gap g between the two coupled rectangular resonators may also be varied to tune the resonant conditions and the phase shifts for light of different colors at any given point x on achromatic flat lens 2400.

Techniques described herein may be used in conjunction with various technologies, such as an artificial reality system. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through). In some AR systems, the artificial images may be presented to users using LED-based display subsystem.

Figure 25:
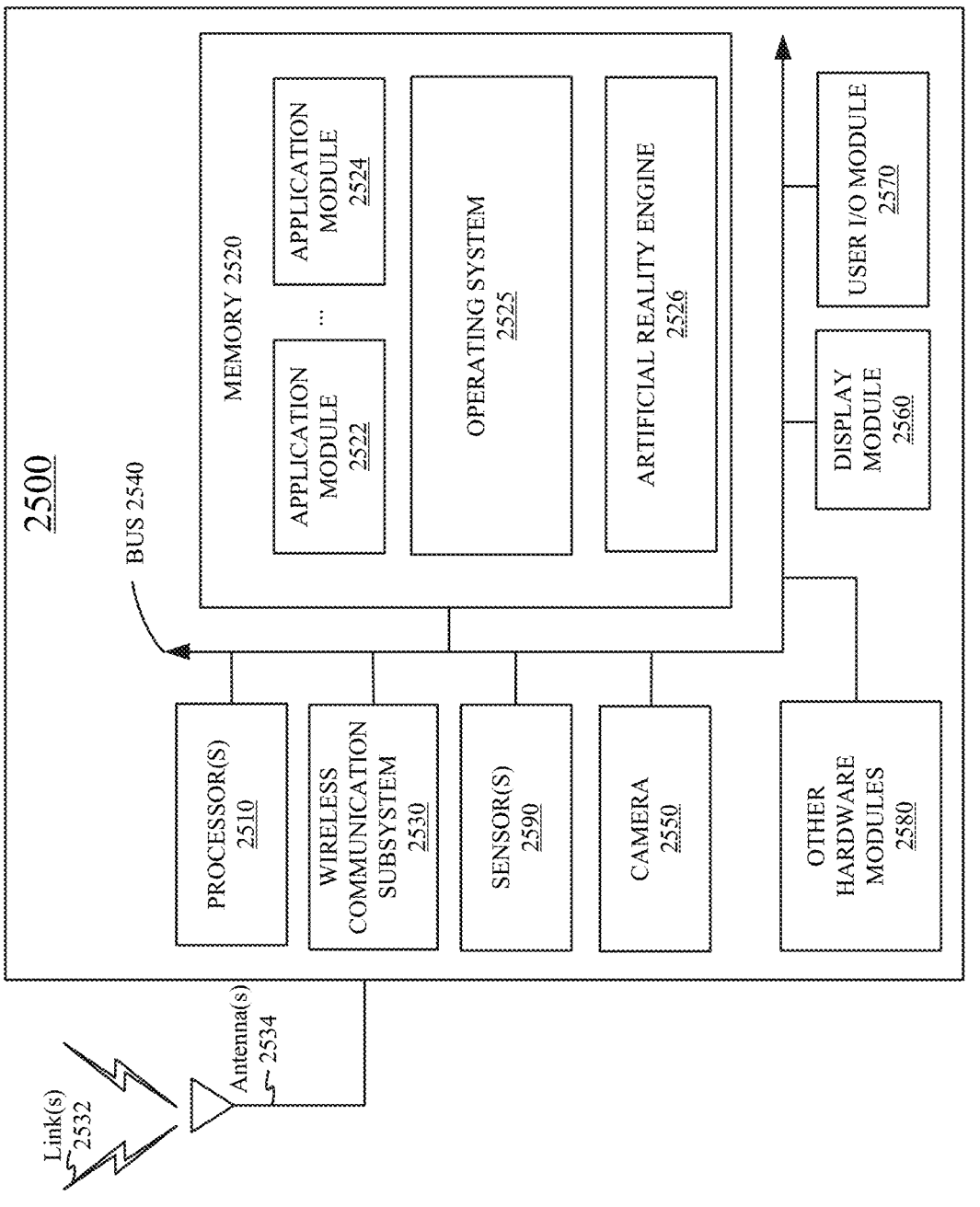
FIG. 25 is a simplified block diagram of an electronic system of an example of a near-eye display according to certain embodiments.

FIG. 25 is a simplified block diagram of an example electronic system 2500 of an example near-eye display (e.g., HMD device) for implementing some of the examples disclosed herein. Electronic system 2500 may be used as the electronic system of an HMD device or other near-eye displays described above. In this example, electronic system 2500 may include one or more processor(s) 2510 and a memory 2520. Processor(s) 2510 may be configured to execute instructions for performing operations at a number of components, and can be, for example, a general-purpose processor or microprocessor suitable for implementation within a portable electronic device. Processor(s) 2510 may be communicatively coupled with a plurality of components within electronic system 2500. To realize this communicative coupling, processor(s) 2510 may communicate with the other illustrated components across a bus 2540. Bus 2540 may be any subsystem adapted to transfer data within electronic system 2500. Bus 2540 may include a plurality of computer buses and additional circuitry to transfer data.

Memory 2520 may be coupled to processor(s) 2510. In some embodiments, memory 2520 may offer both short-term and long-term storage and may be divided into several units. Memory 2520 may be volatile, such as static random access memory (SRAM) and/or dynamic random access memory (DRAM) and/or non-volatile, such as read-only memory (ROM), flash memory, and the like. Furthermore, memory 2520 may include removable storage devices, such as secure digital (SD) cards. Memory 2520 may provide storage of computer-readable instructions, data structures, program modules, and other data for electronic system 2500. In some embodiments, memory 2520 may be distributed into different hardware modules. A set of instructions and/or code might be stored on memory 2520. The instructions might take the form of executable code that may be executable by electronic system 2500, and/or might take the form of source and/or installable code, which, upon compilation and/or installation on electronic system 2500 (e.g., using any of a variety of generally available compilers, installation programs, compression/decompression utilities, etc.), may take the form of executable code.

In some embodiments, memory 2520 may store a plurality of application modules 2522 through 2524, which may include any number of applications. Examples of applications may include gaming applications, conferencing applications, video playback applications, or other suitable applications. The applications may include a depth sensing function or eye tracking function. Application modules 2522-1824 may include particular instructions to be executed by processor(s) 2510. In some embodiments, certain applications or parts of application modules 2522-1824 may be executable by other hardware modules 2580. In certain embodiments, memory 2520 may additionally include secure memory, which may include additional security controls to prevent copying or other unauthorized access to secure information.

In some embodiments, memory 2520 may include an operating system 2525 loaded therein. Operating system 2525 may be operable to initiate the execution of the instructions provided by application modules 2522-1824 and/or manage other hardware modules 2580 as well as interfaces with a wireless communication subsystem 2530 which may include one or more wireless transceivers. Operating system 2525 may be adapted to perform other operations across the components of electronic system 2500 including threading, resource management, data storage control and other similar functionality.

Wireless communication subsystem 2530 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2500 may include one or more antennas 2534 for wireless communication as part of wireless communication subsystem 2530 or as a separate component coupled to any portion of the system. Depending on desired functionality, wireless communication subsystem 2530 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2530 may permit data to be exchanged with a network, other computer systems, and/or any other devices described herein. Wireless communication subsystem 2530 may include a means for transmitting or receiving data, such as identifiers of HMD devices, position data, a geographic map, a heat map, photos, or videos, using antenna(s) 2534 and wireless link(s) 2532. Wireless communication subsystem 2530, processor(s) 2510, and memory 2520 may together comprise at least a part of one or more of a means for performing some functions disclosed herein.

Embodiments of electronic system 2500 may also include one or more sensors 2590. Sensor(s) 2590 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2590 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or any combination thereof. The position sensors may be located external to the IMU, internal to the IMU, or any combination thereof. At least some sensors may use a structured light pattern for sensing.

Electronic system 2500 may include a display module 2560. Display module 2560 may be a near-eye display, and may graphically present information, such as images, videos, and various instructions, from electronic system 2500 to a user. Such information may be derived from one or more application modules 2522-1824, virtual reality engine 2526, one or more other hardware modules 2580, a combination thereof, or any other suitable means for resolving graphical content for the user (e.g., by operating system 2525). Display module 2560 may use LCD technology, LED technology (including, for example, OLED, ILED, μ-LED, AMO-LED, TOLED, etc.), light emitting polymer display (LPD) technology, or some other display technology.

Electronic system 2500 may include a user input/output module 2570. User input/output module 2570 may allow a user to send action requests to electronic system 2500. An action request may be a request to perform a particular action. For example, an action request may be to start or end an application or to perform a particular action within the application. User input/output module 2570 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2500. In some embodiments, user input/output module 2570 may provide haptic feedback to the user in accordance with instructions received from electronic system 2500. For example, the haptic feedback may be provided when an action request is received or has been performed.

Electronic system 2500 may include a camera 2550 that may be used to take photos or videos of a user, for example, for tracking the user's eye position. Camera 2550 may also be used to take photos or videos of the environment, for example, for VR, AR, or MR applications. Camera 2550 may include, for example, a complementary metal-oxide-semiconductor (CMOS) image sensor with a few millions or tens of millions of pixels. In some implementations, camera 2550 may include two or more cameras that may be used to capture 3-D images.

In some embodiments, electronic system 2500 may include a plurality of other hardware modules 2580. Each of other hardware modules 2580 may be a physical module within electronic system 2500. While each of other hardware modules 2580 may be permanently configured as a structure, some of other hardware modules 2580 may be temporarily configured to perform specific functions or temporarily activated. Examples of other hardware modules 2580 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2580 may be implemented in software.

In some embodiments, memory 2520 of electronic system 2500 may also store a virtual reality engine 2526. Virtual reality engine 2526 may execute applications within electronic system 2500 and receive position information, acceleration information, velocity information, predicted future positions, or any combination thereof of the HMD device from the various sensors. In some embodiments, the information received by virtual reality engine 2526 may be used for producing a signal (e.g., display instructions) to display module 2560. For example, if the received information indicates that the user has looked to the left, virtual reality engine 2526 may generate content for the HMD device that mirrors the user's movement in a virtual environment. Additionally, virtual reality engine 2526 may perform an action within an application in response to an action request received from user input/output module 2570 and provide feedback to the user. The provided feedback may be visual, audible, or haptic feedback. In some implementations, processor(s) 2510 may include one or more GPUs that may execute virtual reality engine 2526.

In various implementations, the above-described hardware and modules may be implemented on a single device or on multiple devices that can communicate with one another using wired or wireless connections. For example, in some implementations, some components or modules, such as GPUs, virtual reality engine 2526, and applications (e.g., tracking application), may be implemented on a console separate from the head-mounted display device. In some implementations, one console may be connected to or support more than one HMD.

In alternative configurations, different and/or additional components may be included in electronic system 2500.

Similarly, functionality of one or more of the components can be distributed among the components in a manner different from the manner described above. For example, in some embodiments, electronic system 2500 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A device comprising:
an array of light sources configured to emit light; and
a metasurface including a plurality of nanostructures and configured to receive and deflect the light emitted by the array of light sources, wherein:
the metasurface includes a plurality of regions, and each light source in the array of light sources corresponds to different regions of the plurality of regions;
the array of light sources include a variable pitch that is smaller at a center of the array of light sources and larger toward a periphery of the array of light sources; and
nanostructures in the different regions of the plurality of regions are configured to deflect normally incident light from each light source corresponding to the different regions of the plurality of regions into different directions towards an eyebox.

2. The device of claim 1, wherein:
the array of light sources are configured to emit light of two or more colors; and
nanostructures in a same region of the plurality of regions are configured to deflect normally incident light of the two or more colors into a same direction towards the eyebox.

3. The device of claim 1, wherein:
the metasurface includes one or more layers;
each layer of the one or more layers including a set of nanostructures of the plurality of nanostructures; and
the set of nanostructures in each layer is characterized by:
a same height and different cross-sectional areas; or
different heights.

4. The device of claim 1, wherein the metasurface is further configured to collimate, focus, or diverge light beams emitted by the array of light sources.

5. The device of claim 1, wherein:
the plurality of nanostructures includes a semiconductor material, a dielectric material, an organic material, or any combination thereof; and
the metasurface includes a low-refractive index material characterized by a refractive index lower than a refractive index of the plurality of nanostructures.

6. The device of claim 1, wherein the plurality of nanostructures is characterized by a uniform height.

7. The device of claim 1, wherein each nanostructure of the plurality of nanostructures is characterized by a cross-sectional dimension comparable to or less than a wavelength of light beams emitted by the array of light sources.

8. The device of claim 1, wherein each nanostructure of the plurality of nanostructures is characterized by a cross-sectional shape of a nanopillar, a nanorod, an etched hole of various sizes, or an irregular shape.

9. The device of claim 1, wherein nanostructures in different regions of the plurality of regions are characterized by different cross-sectional shapes, different sizes, different pitches, different orientations, or a combination thereof.

10. The device of claim 1, wherein each region of the plurality of regions is characterized by a phase profile of a lens, a lens array, an off-axis lens, a prism, a grating, a freeform optical component, or a combination thereof.

11. The device of claim 1, wherein nanostructures in each region of the plurality of regions are configured to diffract incident light of different colors into different respective diffraction orders but at a same diffraction angle or similar diffraction angles.

12. The device of claim 1, wherein nanostructures in different regions of the plurality of regions are characterized by different group delays.

13. The device of claim 1, wherein the array of light sources include light-emitting diodes (LEDs), micro-LEDs, organic LEDs (OLEDs), quantum dot LEDs (QDLEDs), quantum dot electro luminescent (QDEL) devices, Perovskite LEDs (PeLEDs), or a liquid crystal display panel including a plurality of color filters.

14. The device of claim 1, wherein the array of light sources is characterized by a minimum pitch less than 100 μm.

15. A near-eye display comprising:
an array of light sources configured to emit light beams;
display optics configured to collect and project the light beams emitted by the array of light sources towards an eyebox of the near-eye display; and
a metasurface between the array of light sources and the display optics, the metasurface including a plurality of nanostructures and configured to receive and deflect the light beams emitted by the array of light sources towards the display optics, wherein:
the metasurface includes a plurality of regions, and each light source in the array of light sources corresponds to different regions of the plurality of regions;
the array of light sources include a variable pitch that is smaller at a center of the array of light sources and larger toward a periphery of the array of light sources; and
nanostructures in the different regions of the plurality of regions are configured to deflect center light rays of the light beams from each light source corresponding to the different regions of the plurality of regions into different directions towards the display optics.

16. The near-eye display of claim 15, wherein:
the array of light sources is configured to emit light beams of two or more colors; and
nanostructures in a same region of the plurality of regions are configured to deflect center light rays of the light beams of two or more colors into a same direction or similar directions towards the display optics.

17. The near-eye display of claim 15, wherein:
the metasurface includes one or more layers;
each flat layer of the one or more layers including a set of nanostructures of the plurality of nanostructures; and
the set of nanostructures in each layer is characterized by:
a same height and different cross-sectional areas; or
different heights.

18. The near-eye display of claim 15, wherein the metasurface is further configured to collimate, focus, or diverge the light beams emitted by the array of light sources.

19. The near-eye display of claim 15, wherein nanostructures in each region of the plurality of regions are configured to diffract incident light of different colors into different respective diffraction orders but at a same diffraction angle or similar diffraction angles.

20. The near-eye display of claim 15, wherein nanostructures in different regions of the plurality of regions are characterized by different group delays.

\* \* \* \* \*